(12) United States Patent
Qin et al.

(10) Patent No.: US 11,348,348 B2
(45) Date of Patent: May 31, 2022

(54) DRIVING STATE ANALYSIS METHOD AND APPARATUS, DRIVER MONITORING SYSTEM AND VEHICLE

(71) Applicant: SHANGHAI SENSETIME INTELLIGENT TECHNOLOGY CO., LTD., Shanghai (CN)

(72) Inventors: Renbo Qin, Shanghai (CN); Daqian Yang, Shanghai (CN)

(73) Assignee: Shanghai SenseTime Intelligent Technology Co., Ltd., Shanghai (CN)

(*) Notice: Subject to any disclaimer, the term of this patent is extended or adjusted under 35 U.S.C. 154(b) by 19 days.

(21) Appl. No.: 17/031,030

(22) Filed: Sep. 24, 2020

(65) Prior Publication Data

US 2021/0004619 A1 Jan. 7, 2021

Related U.S. Application Data

(63) Continuation of application No. PCT/CN2019/111932, filed on Oct. 18, 2019.

(30) Foreign Application Priority Data

Oct. 19, 2018 (CN) .......................... 201811224316.3

(51) Int. Cl.
*G06V 20/59* (2022.01)
*G06T 7/70* (2017.01)
(Continued)

(52) U.S. Cl.
CPC ............. *G06V 20/597* (2022.01); *B60Q 9/00* (2013.01); *G06K 9/6217* (2013.01);
(Continued)

(58) Field of Classification Search
CPC ................................... G06T 7/70; B60Q 9/00
See application file for complete search history.

(56) References Cited

U.S. PATENT DOCUMENTS

2007/0030157 A1* 2/2007 Park ...................... G08B 21/06
340/576
2013/0073115 A1 3/2013 Levin et al.
(Continued)

FOREIGN PATENT DOCUMENTS

CN 102930693 A 2/2013
CN 102975721 A 3/2013
(Continued)

OTHER PUBLICATIONS

International Search Report for Application No. PCT/CN2019/111932, dated Jan. 19, 2020, 4 pages.
(Continued)

*Primary Examiner* — Edward Park

(57) ABSTRACT

The embodiments of the present disclosure disclose a driving state analysis method. The driving state analysis method includes: performing fatigue state detection and distraction state detection for a driver on a driver image to obtain a fatigue state detection result and a distraction state detection result; in response to one of the fatigue state detection result and the distraction state detection result satisfying a predetermined alarm condition, outputting alarm information of a corresponding detection result that satisfies the predetermined alarm condition; and/or, in response to both the fatigue state detection result and the distraction state detection result satisfying the predetermined alarm condition, outputting alarm information of the fatigue state detection result that satisfies the predetermined alarm condition.

19 Claims, 3 Drawing Sheets

Perform fatigue state detection and distraction state detection for a driver on a driver image to obtain a fatigue state detection result and a distraction state detection result — 102

In response to one of the fatigue state detection result and the distraction state detection result satisfying a predetermined alarm condition, output alarm information of a corresponding detection result that satisfies the predetermined alarm condition; and/or, in response to both the fatigue state detection result and the distraction state detection result satisfying the predetermined alarm condition, output alarm information of the fatigue state detection result that satisfies the predetermined alarm condition — 104

(51) Int. Cl.
    *B60Q 9/00*     (2006.01)
    *G06K 9/62*     (2022.01)
    *G06V 10/22*     (2022.01)
    *G06V 10/40*     (2022.01)
    *G06V 40/18*     (2022.01)
    *G06V 40/10*     (2022.01)
    *G06V 40/16*     (2022.01)

(52) U.S. Cl.
    CPC .............. *G06K 9/6267* (2013.01); *G06T 7/70* (2017.01); *G06V 10/22* (2022.01); *G06V 10/40* (2022.01); *G06V 40/107* (2022.01); *G06V 40/161* (2022.01); *G06V 40/171* (2022.01); *G06V 40/18* (2022.01); *G06T 2207/20084* (2013.01); *G06T 2207/30201* (2013.01); *G06T 2207/30268* (2013.01)

(56) References Cited

U.S. PATENT DOCUMENTS

2019/0122525 A1     4/2019     Lancelle
2019/0129416 A1*     5/2019     Upmanue ............. B60W 40/08

FOREIGN PATENT DOCUMENTS

| | | |
|---|---|---|
| CN | 105574487 A | 5/2016 |
| CN | 108022451 A | 5/2018 |
| CN | 108437999 A | 8/2018 |
| JP | 2007097668 A | 4/2007 |
| JP | 2007265377 A | 10/2007 |
| JP | 2009012608 A | 1/2009 |
| JP | 2014115983 A | 6/2014 |
| JP | 2016018304 A | 2/2016 |
| JP | 2017217472 A | 12/2017 |
| JP | 2018133007 A | 8/2018 |
| WO | 2017149047 A1 | 9/2017 |

OTHER PUBLICATIONS

Intellectual Property Office of Singapore, Search Report and Written Opinion Issued in Application No. 11202009420R, dated Dec. 9, 2021, 9 pages.

Japanese Patent Office Action, Office Action Issued in Application No. 2020-551931, dated Nov. 24, 2021, 12 pages.

* cited by examiner

DRIVING STATE ANALYSIS METHOD AND APPARATUS, DRIVER MONITORING SYSTEM AND VEHICLE

CROSS REFERENCE TO RELATED APPLICATIONS

The present disclosure is a continuation of International Application No. PCT/CN2019/111932, filed on Oct. 18, 2019, which claims a priority of Chinese Patent Application No. CN 201811224316.3, filed on Oct. 19, 2018, all of which are incorporated herein by reference in their entirety.

TECHNICAL FIELD

The present disclosure relates to computer vision technologies, and in particular, to a driving state analysis method and apparatus, a driver monitoring system and a vehicle.

BACKGROUND

With the continuous popularization of vehicles, traffic accidents also increase, and the driving state of drivers has a serious impact on safe driving. If the driving state of a driver is poor, for example, if the driving state is poor due to excessive fatigue, insufficient sleep, distracted attention, etc., it may lead to a decline in judgment ability, delay in response, and even a trance or instant memory loss, resulting in unsafe factors such as delayed or premature driving actions, stalled operations or improper correction time, and as a result, road traffic accidents are extremely likely to occur. During driving, if the driver's attention is distracted by other things, such as a mobile phone, the driving safety hazards are increased.

SUMMARY

Embodiments of the present disclosure provide technical solutions for driving state analysis.

According to one aspect of the embodiments of the present disclosure, provided is a driving state analysis method, including:

performing fatigue state detection and distraction state detection for a driver on a driver image to obtain a fatigue state detection result and a distraction state detection result; and in response to one of the fatigue state detection result and the distraction state detection result satisfying a predetermined alarm condition, outputting alarm information of a corresponding detection result that satisfies the predetermined alarm condition; and/or, in response to both the fatigue state detection result and the distraction state detection result satisfying the predetermined alarm condition, outputting alarm information of the fatigue state detection result that satisfies the predetermined alarm condition.

According to another aspect of the embodiments of the present disclosure, provided is a driving state analysis apparatus, including:

a driving state detection module, configured to perform fatigue state detection and distraction state detection for a driver on a driver image to obtain a fatigue state detection result and a distraction state detection result; and an alarm module, configured to: in response to one of the fatigue state detection result and the distraction state detection result satisfying a predetermined alarm condition, output alarm information of a corresponding detection result that satisfies the predetermined alarm condition; and/or, in response to both the fatigue state detection result and the distraction state detection result satisfying the predetermined alarm condition, output alarm information of the fatigue state detection result that satisfies the predetermined alarm condition.

According to yet another aspect of the embodiments of the present disclosure, provided is a driver monitoring system, including:

a display device, configured to display a driver image; and a driving state analysis apparatus, configured to: perform fatigue state detection and distraction state detection for a driver on the driver image; in response to one of a fatigue state detection result and a distraction state detection result satisfying a predetermined alarm condition, output alarm information of a corresponding detection result that satisfies the predetermined alarm condition; and/or, in response to both the fatigue state detection result and the distraction state detection result satisfying the predetermined alarm condition, output alarm information of the fatigue state detection result that satisfies the predetermined alarm condition.

According to still another aspect of the embodiments of the present disclosure, provided is an electronic device, including:

a memory, configured to store a computer program; and a processor, configured to execute the computer program stored in the memory, where when the computer program is executed, the method according to any of the foregoing embodiments of the present disclosure is implemented.

According to still another aspect of the embodiments of the present disclosure, provided is a computer-readable storage medium, having computer program stored thereon, where when the computer program is executed by a processor, the method according to any of the foregoing embodiments of the present disclosure is implemented.

According to still another aspect of the embodiments of the present disclosure, provided is a vehicle, including a central control system, and further including: the driving state analysis apparatus according to any of the foregoing embodiments of the present disclosure, or the driver monitoring system according to any of the foregoing embodiments of the present disclosure.

Based on the driving state analysis method and apparatus, the driver monitoring system, the vehicle, the electronic device, and the medium provided by the foregoing embodiments of the present disclosure, joint detection of the driver's fatigue state and the driver's distraction state can be implemented on a driver image; when one of the fatigue state detection result and the distraction state detection result satisfies a predetermined alarm condition, alarm information of a corresponding detection result that satisfies the predetermined alarm condition is output; and/or, when both the fatigue state detection result and the distraction state detection result satisfy the predetermined alarm condition, alarm information of the fatigue state detection result that satisfies the predetermined alarm condition is output, in order to prompt the driver to pay attention, thus improving driving safety and reducing the incidence of road traffic accidents. Moreover, when both the fatigue state detection result and the distraction state detection result satisfy the predetermined alarm condition, only the alarm information of the fatigue state detection result that satisfies the predetermined alarm condition is output, so that the distraction and disgust of the driver caused by too many or too frequent alarms may be avoided. The present disclosure improves the driving safety and user experience by optimizing the alarm strategy.

The technical solutions of the present disclosure are further described below in detail with reference to the accompanying drawings and embodiments.

BRIEF DESCRIPTION OF THE DRAWINGS

The accompanying drawings constituting a part of the description describe the embodiments of the present disclosure and are intended to explain the principles of the present disclosure together with the descriptions.

According to the following detailed descriptions, the present disclosure can be understood more clearly with reference to the accompanying drawings.

DETAILED DESCRIPTION OF THE EMBODIMENTS

Figure 1:
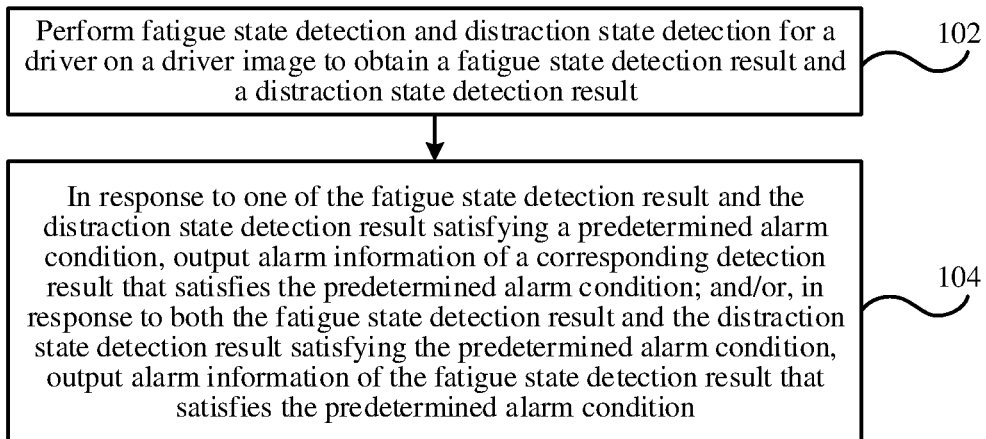
FIG. 1 is a flowchart of one embodiment of a driving state analysis method according to the present disclosure.

Various exemplary embodiments of the present disclosure are now described in detail with reference to the accompanying drawings. It should be noted that, unless otherwise stated specifically, relative arrangement of the components and steps, the numerical expressions, and the values set forth in the embodiments are not intended to limit the scope of the present disclosure.

It should be understood that the terms such as "first" and "second" in the embodiments of the present disclosure are merely for distinguishing, and should not be construed as a limitation on the embodiments of the present disclosure.

It should be further understood that in the embodiments of the present disclosure, "multiple" may mean two or more, and "at least one" may mean one, or two or more.

It should also be understood that any component, data, or structure mentioned in the embodiments of the present disclosure may be generally understood as one or more when no specific limitation is imposed or no reverse enlightenment is given above or below.

It should be further understood that descriptions of the embodiments in the present disclosure emphasize differences between the embodiments. For a same or similar part, reference may be made to each other. For brevity, details are not described again.

In addition, it should be understood that, for ease of description, the size of each part shown in the accompanying drawings is not drawn in actual proportion.

The following descriptions of at least one exemplary embodiment are merely illustrative actually, and are not intended to limit the present disclosure and the applications or uses thereof.

Technologies, methods and devices known to a person of ordinary skill in the related art may not be discussed in detail, but such technologies, methods and devices should be considered as a part of the description in appropriate situations.

It should be noted that similar reference numerals and letters in the following accompanying drawings represent similar items. Therefore, once an item is defined in an accompanying drawing, the item does not need to be further discussed in the subsequent accompanying drawings.

In addition, the term "and/or" as used herein merely describes an association relationship between associated objects, indicating that there may be three relationships, for example, A and/or B, which may indicate that A exists separately, both A and B exist, and B exists separately. In addition, the character "/" in the present disclosure generally indicates that the associated objects are in an "or" relationship.

The embodiments of the present disclosure may be applied to electronic devices such as terminal devices, computer systems, and servers, which may operate with numerous other general-purpose or special-purpose computing system environments or configurations. Examples of well-known terminal devices, computing systems, environments, and/or configurations suitable for use together with the electronic devices such as terminal devices, computer systems, and servers include, but are not limited to, vehicle-mounted devices, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the systems, and the like.

The electronic devices such as terminal devices, computer systems, and servers may be described in the general context of computer system executable instructions (such as, program modules) executed by the computer systems. Generally, the program modules may include routines, programs, target programs, components, logics, data structures, and the like for performing specific tasks or implementing specific abstract data types. The computer systems/servers may be practiced in the distributed cloud computing environments in which tasks are performed by remote processing devices that are linked through a communications network. In the distributed computing environments, the program modules may be located in local or remote computing system storage media including storage devices.

The neural network in the embodiments of the present disclosure may be a multi-layer neural network (i.e., a deep neural network), where the neural network may be a multi-layer convolutional neural network, such as LeNet, AlexNet, GoogLeNet, VGG, ResNet and other arbitrary neural network models. Each neural network may be a neural network of the same type and structure, or a neural network of a different type and/or structure, which is not limited in the embodiments of the present application.

FIG. 1 is a flowchart of one embodiment of a driving state analysis method according to the present disclosure. As shown in FIG. 1, the driving state analysis method in the embodiments includes the following steps.

At 102, fatigue state detection and distraction state detection for a driver are performed on a driver image to obtain a fatigue state detection result and a distraction state detection result.

In one optional example, operation 102 may be executed by a processor by invoking a corresponding instruction stored in a memory, or may be executed by a driving state detection module run by the processor.

At 104, in response to one of the fatigue state detection result and the distraction state detection result satisfying a predetermined alarm condition, alarm information of a corresponding detection result that satisfies the predetermined alarm condition is output, for example, alarming is performed by means of sound (such as voice or ringing)/light (such as lighting or light flashing)/vibration, etc.; and/or, in response to both the fatigue state detection result and the distraction state detection result satisfying the predetermined alarm condition, alarm information of the fatigue state detection result that satisfies the predetermined alarm condition is output, for example, alarming is performed by means of sound (such as voice or ringing)/light (such as lighting or light flashing)/vibration, etc.

In some implementations, in the above-mentioned operation 104, in response to one of the fatigue state detection result and the distraction state detection result satisfying the predetermined alarm condition, outputting the alarm information of the corresponding detection result that satisfies the predetermined alarm condition includes: outputting prompt/warning information corresponding to the fatigue state detection result when the fatigue state detection result is a fatigue state; and/or, outputting prompt/warning information corresponding to the distraction state detection result when the distraction state detection result is a distraction state.

In one optional example, operation 104 may be executed by a processor by invoking a corresponding instruction stored in a memory, or may be executed by an alarm module run by the processor.

Based on the driving state analysis method provided by the foregoing embodiments of the present disclosure, joint detection of the driver's fatigue state and the driver's distraction state can be implemented on a driver image; when one of the fatigue state detection result and the distraction state detection result satisfies a predetermined alarm condition, alarm information of a corresponding detection result that satisfies the predetermined alarm condition is output; and/or, when both the fatigue state detection result and the distraction state detection result satisfy the predetermined alarm condition, alarm information of the fatigue state detection result that satisfies the predetermined alarm condition is output, in order to prompt the driver to pay attention, thus improving driving safety and reducing the incidence of road traffic accidents. Moreover, when both the fatigue state detection result and the distraction state detection result satisfy the predetermined alarm condition, only the alarm information of the fatigue state detection result that satisfies the predetermined alarm condition is output, so that the distraction and disgust of the driver caused by too many or too frequent alarms may be avoided. The present disclosure improves the safety of assisted driving and user experience by optimizing the alarm strategy.

In another embodiment of the driving state analysis method of the present disclosure, the method further includes:

suppressing alarm information corresponding to other detection results (such as the distraction state detection result) that satisfy the predetermined alarm condition within a preset period of time after outputting the alarm information corresponding to the fatigue state detection result; and/or, suppressing the alarm information corresponding to other detection results (such as the fatigue state detection result) that satisfy the predetermined alarm condition within a preset period of time after outputting the alarm information corresponding to the distraction state detection result.

The embodiments may further avoid the distraction and disgust of a driver caused by too many or too frequent alarms, and further improves the safety of assisted driving and user experience by further optimizing the alarm strategy.

Figure 2:
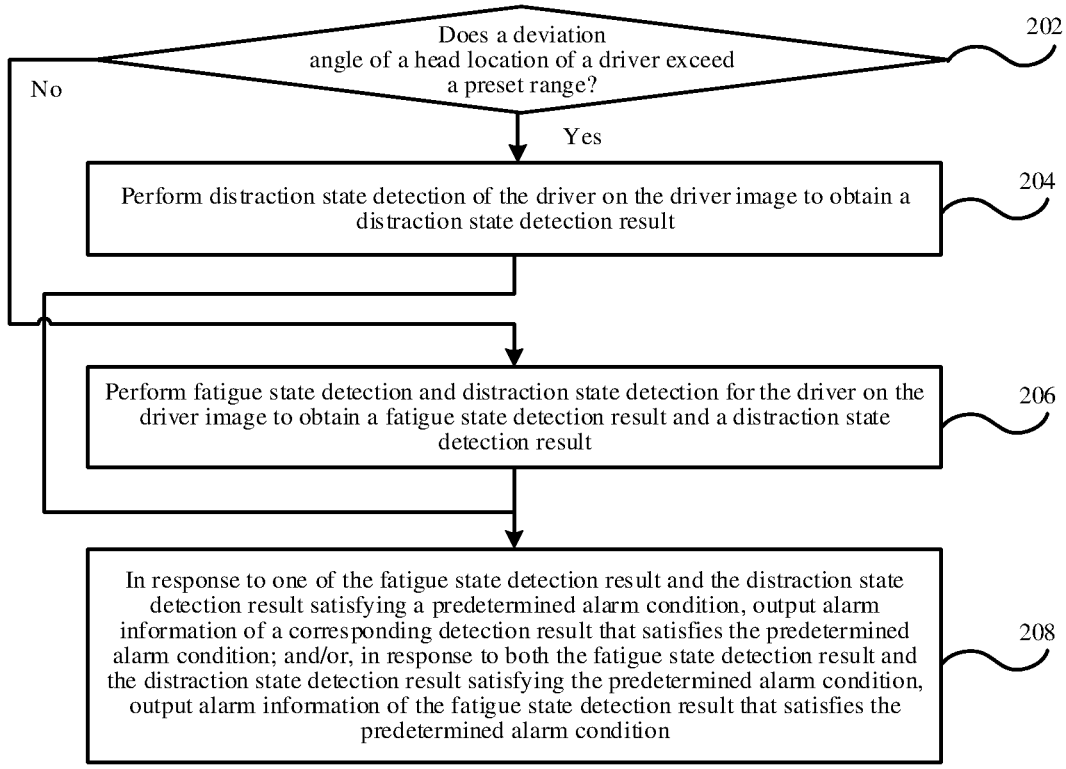
FIG. 2 is a flowchart of another embodiment of a driving state analysis method according to the present disclosure.

FIG. 2 is a flowchart of another embodiment of a driving state analysis method according to the present disclosure. As shown in FIG. 2, the driving state analysis method in the embodiments includes the following steps.

At 202, whether a deviation angle of a head location of the driver in the driver image exceeds a preset range is determined.

If the deviation angle of the head location of the driver exceeds the preset range, operation 204 is executed. Otherwise, if the deviation angle of the head location of the driver does not exceed the preset range, operation 206 is executed.

In one optional example, operation 202 may be executed by a processor by invoking a corresponding instruction stored in a memory, or may be performed by a first determination module run by the processor.

At 204, distraction state detection for the driver is performed on the driver image to obtain the distraction state detection result of the driver.

In some implementations, performing distraction state detection for the driver on the driver image includes: performing head pose detection and/or eye state detection on the driver image to obtain head pose information and/or eye state information; and determining the distraction state detection result of the driver according to the head pose information and/or the eye state information, for example, determining a parameter value of an index for representing the distraction state of the driver according to the head pose information and/or the eye state information, and determining the distraction state detection result of the driver according to the parameter value of the index for representing the distraction state of the driver.

Then, operation 208 is executed.

At 206, fatigue state detection and distraction state detection for the driver are performed on the driver image to obtain the fatigue state detection result and the distraction state detection result.

In some implementations, performing fatigue state detection and distraction state detection for the driver on the driver image includes: performing head pose detection, eye state detection, and/or mouth state detection on the driver image to obtain head pose information, eye state information, and/or mouth state information; and determining the fatigue state detection result and the distraction state detection result of the driver according to the head pose information, the eye state information, and/or the mouth state information, for example, determining a parameter value of an index for representing the fatigue state of the driver and a parameter value of an index for representing the distraction state of the driver according to the head pose information, the eye state information, and/or the mouth state information, and determining the fatigue state detection result of the driver according to the parameter value of the index for representing the fatigue state of the driver, and determining the distraction state detection result of the driver according to the parameter value of the index for representing the distraction state of the driver.

In some optional examples, the parameter value of the index for representing the fatigue state of the driver is determined according to the head pose information, the eye state information, and the mouth state information.

In one optional example, operations 204-206 may be executed by a processor by invoking a corresponding instruction stored in a memory, or may be executed by a driving state detection module run by the processor.

At 208, in response to one of the fatigue state detection result and the distraction state detection result satisfying a predetermined alarm condition, alarm information of the corresponding detection result that satisfies the predetermined alarm condition is output; and/or, in response to both the fatigue state detection result and the distraction state detection result satisfying the predetermined alarm condition, alarm information of the fatigue state detection result that satisfies the predetermined alarm condition is output.

In one optional example, operation 208 may be executed by a processor by invoking a corresponding instruction stored in a memory, or may be executed by an alarm module run by the processor.

In the foregoing embodiments, when the deviation angle of the head location exceeds the preset range, the driver may be in a distraction state. Therefore, merely the distraction state detection is performed on the driver, and the fatigue state detection is not performed, and thus the effect of driving state monitoring is implemented, thereby saving computing resources required for fatigue state detection and improving the efficiency of driving state analysis. When the deviation angle of the head location does not exceed the preset range, the driver may be in a distraction state or fatigue state. Therefore, the distraction state detection and fatigue state detection are performed on the driver simultaneously, which implements joint monitoring of the driver states to ensure driving safety.

In some implementations, performing head pose detection, eye state detection, and/or mouth state detection on the driver image to obtain the head pose information, the eye state information, and/or the mouth state information includes:

performing face key point detection on the driver image; and obtaining the head pose information, the eye state information, and/or the mouth state information according to the detected face key points.

In some optional examples, the head pose information may be obtained by means of a first neural network based on the face key points when the head pose information is obtained according to the detected face key points.

In some optional examples, the head pose information may be obtained, for example, by means of the first neural network based on the face key points when the head pose information is obtained according to the detected face key points.

In some implementations, the head pose may be expressed by a pose angle/Euler angle of the head in a normalized spherical coordinate system (i.e., a camera coordinate system where the camera is located) in a normal driving state, where the pose angle/Euler angle includes: a pitch angle $\theta$ (pitch), a yaw angle $\psi$ (yaw), and a roll angle $\Phi$ (roll). The head pose information includes: (pitch, yaw, roll). The pitch angle is used to indicate the angle at which the face is lowered or raised in the vertical direction, the yaw angle is used to indicate the angle of the side face (i.e., head turn) in the horizontal direction, and the roll angle is used to indicate the angle at which the face is tilted (i.e., leaned toward the shoulder) in the vertical direction.

In the case of a fixed face size, taking a possible application scenario as an example, when the camera that captures the driver image is located directly in front of the driver's location and faces the driver's location, the smaller the yaw angle, pitch angle and roll angle are, a more frontal face is presented, and the better the driving state of the driver is. The situation in which the yaw angle, pitch angle, and roll angle are all 0 is set as the reference head pose. In this case, the driver is in the best driving state. When the pitch angle and/or yaw angle is greater than a preset angle threshold and the duration is greater than a preset time threshold, the distraction state detection result is determined as a distraction state (i.e., inattention). When the pitch angle changes from 0 degree to a certain angle and then returns to 0 degree within a preset short period of time (corresponding to the nap nodding action in which the head suddenly lowers from the normal location and then returns to the normal location), the fatigue state detection result is determined as a fatigue state (i.e., the fatigue driving level). For application scenarios where the camera is located at other locations, the head pose information is determined based on an included angle between the camera at the location and the camera located directly in front of the driver's location and facing the driver's location as the reference head pose. A person skilled in the art knows specific implementation based on the embodiments of the present disclosure, and details are not described herein again.

The first neural network may be pre-trained based on a deep learning technology. In the embodiments, the first neural network is configured to obtain the head pose information based on the face key points, which may improve the accuracy of the obtained head pose information, thereby improving the accuracy of detection results of driver states.

In addition, face key point detection may also be performed by means of a pre-trained neural network, so as to improve the accuracy of a face key point detection result and further improve the accuracy of head pose information, thereby improving the accuracy of detection results of driver states.

In some optional examples, obtaining the eye state information according to the detected face key points may, for example, include: determining an eye region image in the driver image according to the face key points; performing detections of an upper eyelid line and a lower eyelid line on the eye region image based on a second neural network; and determining eye open/closed state information of the driver according to the spacing between the upper eyelid line and the lower eyelid line. The eye open/closed state includes an eye open state, an eye semi-closed state, or an eye closed state. The eye state information includes the eye open/closed state information. In one optional example, the eyes in the driver image are positioned by using an eye key point in the face key points (e.g., coordinate information of the eye key point in the driver image), to obtain an eye region image, and an upper eyelid line and a lower eyelid line are obtained by using the eye region image, and the eye open/closed state information is obtained by computing the spacing between the upper eyelid line and the lower eyelid line. Alternatively, in another optional example, face key point detection may also be performed on the driver image, and computation is performed by directly using the eye key point in the detected face key points, so as to obtain the eye open/closed state information according to the computing result. The eye open/closed state information may be used to detect eye closure of the driver, for example, whether the driver's eyes are semi-closed ("semi-" represents the state that the eyes are not completely closed, for example, squinted in the sleepy state and the like), whether the driver closes the eyes, the number of eye closures, the eye closure level and the like. Optionally, the eye open/closed state information may be the information obtained by performing normalization processing on the level of eye opening.

The second neural network may be pre-trained based on a deep learning technology. In the embodiments, the upper eyelid line and the lower eyelid line are detected by using the second neural network, so as to implement accurate detection of the upper eyelid line and lower eyelid line locations, thereby improving the accuracy of eye open/closed state information, so as to improve the accuracy of detection results of driver states.

In addition, in some other optional examples, obtaining the eye state information according to the detected face key points may, for example, include: determining an eye region image in the driver image according to the face key points; and performing eye open/closed classification processing on the eye region image based on a third neural network, to obtain an eye open classification result or an eye closed classification result, which correspondingly represents that the eyes are in an eye open state or an eye closed state. The eye state information includes an eye open state or an eye closed state corresponding to the eye open classification result or the eye closed classification result. For example, the third neural network may perform feature extraction and eye open/closed classification processing on the input eye region image, and output a classification result of the eye open probability (the value range may be 0-1) or the eye closed probability (the value range may be 0-1), and it is determined based on the eye open probability or the eye closed probability that the eyes are in the open or closed state, thereby obtaining the driver's eye state.

The third neural network may be trained directly using an eye open sample image and an eye closed sample image based on the deep learning technology. The trained third neural network may directly obtain the eye open classification result or an eye closed classification result for the input image, without computing the eye open/closed degree. In the embodiments, the eye state of the driver in the eye region image is obtained based on the third neural network, which may improve the accuracy and detection efficiency of eye state information, thereby improving the accuracy and detection efficiency of detection results of driver states.

In some optional examples, obtaining the mouth state information according to the detected face key points may, for example, include: determining a mouth region image in the driver image according to the face key points; performing detections of an upper lip line and a lower lip line on the mouth region image based on a fourth neural network; and determining mouth open/closed state information of the driver according to the spacing between the upper lip line and the lower lip line. The mouth open/closed state includes an open state (i.e., a mouth open state), a closed state (i.e., a mouth closed state), a semi-closed state (i.e., a mouth semi-opened state), and the like of the mouth. The mouth state information includes the mouth open/closed state information. For example, in one optional example, the mouth in the driver image is first positioned by using a mouth key point in the face key points (e.g., coordinate information of the mouth key point in the driver image). The mouth region image may be obtained by cutting or the like, and the upper lip line and the lower lip line may be obtained by using the mouth region image. The mouth open/closed state information is obtained by computing the spacing between the upper lip line and the lower lip line. In another optional example, the mouth key point in the face key points may be directly used for computation, and the mouth open/closed state information may be obtained according to the computation result.

The mouth open/closed state information may be used to perform yawn detection for the driver, for example, detecting whether the driver yawns, and the number of yawns, etc. Optionally, the mouth open/closed state information may be the information obtained by performing normalization processing on the level of mouth opening.

The fourth neural network may be pre-trained based on a deep learning technology. In the embodiments, the upper lip line and the lower lip line are detected by using the fourth neural network, so as to implement accurate detection of the upper lip line and lower lip line locations, thereby improving the accuracy of mouth open/closed state information, so as to improve the accuracy of detection results of driver states.

In some other optional examples, obtaining the mouth state information according to the detected face key points may, for example, include: determining a mouth region image in the driver image according to the face key points; and performing mouth open/closed classification processing on the mouth region image based on a fifth neural network, to obtain a mouth open classification result or a mouth closed classification result, which correspondingly represents that the mouth is in a mouth open state or a mouth closed state. The mouth state information includes the mouth open state or the mouth closed state. For example, the fifth neural network may perform feature extraction and mouth open/closed classification processing on the input mouth region image, and output the mouth open (i.e., the mouth open state) probability (the value range may be 0-1) or the mouth closed (i.e., the mouth closed state) probability (the value range may be 0-1), and it is determined based on the mouth open probability or the mouth closed probability that the mouth is in the open or closed state, thereby obtaining the mouth state information of the driver.

The fifth neural network may be trained directly using a mouth open sample image and a mouth closed sample image based on the deep learning technology. The trained fifth neural network may directly obtain the mouth open classification result or the mouth closed classification result for the input image, without detecting the upper lip line and the lower lip line and computing the spacing therebetween. In the embodiments, the mouth state information of the driver in the mouth region image is obtained based on the fifth neural network, which may improve the accuracy and detection efficiency of mouth state information, thereby improving the accuracy and detection efficiency of detection results of driver states.

In some implementations, the index for representing the fatigue state of the driver may, for example, include, but is not limited to, the nap degree, the eye closure degree, the blink degree, and the yawning degree; and/or, the index for representing the distraction state of the driver may, for example, include, but is not limited to: the head location deviation degree, the face orientation deviation degree, the gaze direction deviation degree, and the daze degree, etc.

In some implementations, in the embodiments, determining the parameter value of the index for representing the distraction state of the driver according to the head pose information and/or the eye state information includes:

determining the head location of the driver in the driver image according to the head pose information to obtain head location information, for example, obtaining a pitch angle in the head pose information as the head location; and obtaining a parameter value of a head location deviation degree according to the head location information within a period of time, where the parameter value of the head location deviation degree may, for example, include, but is not limited to, any one or more of the following: the head location deviation state, the head location deviation direction, a deviation angle of the head location in the head location deviation direction, a head location deviation duration, or a head location deviation frequency; and/or, determining face orientation of the driver in the driver image according to the head pose information to obtain face orientation information, where the face orientation information may, for example, include the direction and angle of face turning, and the turning direction herein may be turning to the left, turning to the right, turning down, and/or turning up, etc., for example, the pitch angle and the yaw angle in the head pose information may be obtained as the face orientation; and obtaining a parameter value of a face orientation deviation degree according to the face orientation information within a period of time, where the parameter value of the face orientation deviation degree may, for example, include, but is not limited to, any one or more of the following: the number of head turns, a head turn duration, or a head turn frequency, etc.; and/or, determining a gaze direction of the driver in the driver image according to the head pose information to obtain gaze direction information, and obtaining a parameter value of a gaze direction deviation degree according to the gaze direction information within a period of time; or determining an eye region image in the driver image according to the face key points, obtaining gaze direction information of the driver in the eye region image based on a sixth neural network, and obtaining a parameter value of a gaze direction deviation degree according to the gaze direction information within a period of time, where the parameter value of the gaze direction deviation degree may, for example, include, but is not limited to, any one or more of the following: a gaze direction deviation angle, a gaze direction deviation duration, or a gaze direction deviation frequency, etc.; and/or, obtaining a parameter value of a daze degree according to the eye state information within a period of time, where the parameter value of the daze degree may, for example, include, but is not limited to, any one or more of the following: eye open level, an eye open duration, or a ratio of an eye open cumulative duration to a statistical time window, etc.

In the embodiments, the parameter value of any one or more indexes for representing the distraction state of the driver in the driver image is detected, and the distraction state detection result of the driver is determined according to the parameter value, so as to determine whether the driver concentrates on driving. Quantifying the driving attention degree into at least one of the indexes such as the head location deviation degree, the face orientation deviation degree, the gaze direction deviation degree, and the daze degree by performing quantification on the index for representing the distraction state of the driver, is beneficial to evaluate the driving attention state of the driver in time and objectively.

In some implementations, in the embodiments, determining the parameter value of the index for representing the fatigue state of the driver according to the head pose information, the eye state information, and/or the mouth state information includes:

determining the head location of the driver in the driver image according to the head pose information to obtain head location information, and obtaining a parameter value of a nap degree according to the head location information within a period of time, where the parameter value of the nap degree may, for example, include, but is not limited to, any one or more of the following: a nap nodding state, a nap nodding level, the number of nap nods, a nap nodding frequency, or a nap nodding duration; and/or, obtaining a parameter value of an eye closure degree according to the eye state information within a period of time, where the parameter value of the eye closure degree may, for example, include, but is not limited to, any one or more of the following: the number of eye closures, an eye closure frequency, an eye closure duration, an eye closure level, the number of eye semi-closures, an eye semi-closure frequency, or a ratio of an eye closure cumulative duration to the statistical time window, etc.; and/or, obtaining a parameter value of a blink degree according to the eye state information within a period of time, where in the embodiments of the present disclosure, according to the eye state information, the process of the eye changing from the eye open state to the eye closed state and then to the eye open state may be considered to complete a blink action, and the time required for the blink action may be, for example, about 0.2-1 s, and the parameter value of the blink degree may, for example, include, but is not limited to, any one or more of the following: the number of blinks, a blink frequency, a blink duration, or a ratio of a blink cumulative duration to the statistical time window, etc.; and/or, obtaining a parameter value of a yawning degree according to the mouth state information within a period of time, where the parameter value of the yawning degree may, for example, include, but is not limited to, any one or more of the following: a yawning state, the number of yawns, a yawn duration, or a yawning frequency, etc.

In the foregoing embodiments, the head pose information may be obtained based on deep learning technology, and the driver's head location, face orientation, and gaze direction in the driver image are determined according to the head pose information, which improves the accuracy of the head location information, the face orientation information, and the gaze direction information, so that the parameter values of the indexes for representing the driver states determined based on the head pose information are more accurate, thereby facilitating improving the accuracy of detection results of driver states.

The head location information may be used to determine whether the driver's head location is normal, such as determining whether the driver lowers his head, raises his head, tilts his head, or turns his head. Optionally, the head location information may be determined by means of the pitch angle, yaw angle, and roll angle of the head. The face orientation information may be used to determine whether the face direction of the driver is normal, for example, determining whether the driver turns his/her face or turns around and the like. Optionally, the face orientation information may be an included angle between the front of the face of the driver and the front of the vehicle driven by the driver. The foregoing gaze direction information may be used to determine whether the gaze direction of the driver is normal, for example, determining whether the driver gazes ahead and the like. The gaze direction information may be used to determine whether a deviation phenomenon occurs in the gaze of the driver. Optionally, the gaze direction information may be an included angle between the gaze of the driver and the front of the vehicle driven by the driver.

In one optional example, if it is determined that the face orientation information is greater than a first orientation, and the phenomenon of being greater than the first orientation continues for N1 frames (for example, continuing for 9 frames, 10 frames or the like), it is determined that the driver has experienced a long-time large-angle head turning, and the long-time large-angle head turning may be recorded, or the duration of this head turning may be recorded. If it is determined that the face orientation information is not greater than the first orientation but is greater than a second orientation, and the phenomenon of being not greater than the first orientation but greater than the second orientation continues for N1 frames (N1 is an integer greater than 0, for example, continuing for 9 frames, 10 frames or the like), it is determined that the driver has experienced a long-time small-angle head turning, and the long-time small-angle head turning may be recorded, or the duration of this head turning may be recorded.

In one optional example, if it is determined that the included angle between the gaze direction information and the front of the vehicle is greater than a first included angle, and the phenomenon of being greater than the first included angle continues for N2 frames (for example, continuing for 8 frames, 9 frames or the like), it is determined that the driver has experienced a severe gaze deviation, and the severe gaze deviation may be recorded, or the duration of this severe gaze deviation may be recorded. If it is determined that the included angle between the gaze direction information and the front of the vehicle is not greater than the first included angle but is greater than a second included angle, and the phenomenon of being not greater than the first included angle but greater than the second included angle continues for N2 frames (N2 is an integer greater than 0, for example, continuing for 9 frames, 10 frames or the like), it is determined that the driver has experienced a gaze deviation, and the gaze deviation may be recorded, or the duration of this gaze deviation may be recorded.

In one optional example, the values of the foregoing first orientation, second orientation, first included angle, second included angle, N1, and N2 may be set according to actual situations, and the present disclosure does not limit the values.

In the foregoing embodiments, the eye state information may be obtained based on the deep learning technology, and the parameter value of the eye closure degree, the parameter value of the daze degree, and the parameter value of the blink degree are determined according to the eye state information, and the accuracy of the parameter value of the eye closure degree, the parameter value of the daze degree, and the parameter value of the blink degree is improved, so that the parameter values of the indexes for representing the driver state determined based on the eye state information are more accurate, thereby facilitating improving the accuracy of detection results of driver states.

In the foregoing embodiments, the mouth state information may be obtained based on deep learning technology, and the parameter value for representing the yawning degree is determined according to the mouth state information, which improves the accuracy of the parameter value of the yawning degree, so that parameter values of the indexes for representing the driver states determined based on the mouth state information are more accurate, thereby facilitating improving the accuracy of detection results of driver states.

In the foregoing embodiments, the sixth neural network may be obtained based on the deep learning technology and trained with sample images in advance. The trained sixth neural network may directly output the gaze direction information for the input image, so as to improve the accuracy of the gaze direction information, thereby improving the accuracy of detection results of driver states.

The sixth neural network may be trained in a variety of ways, which is not limited in the present disclosure. For example, in one approach, a first gaze direction may be determined according to a camera that captures a sample image and a pupil in the sample image. The sample image includes at least an eye image. The gaze direction of the sample image is detected by means of the sixth neural network, to obtain a first detected gaze direction. The sixth neural network is trained according to the first gaze direction and the first detected gaze direction. For another example, in one approach, first coordinates of a pupil reference point in the sample image in a first camera coordinate system are determined, and second coordinates of a corneal reference point in the sample image in the first camera coordinate system are determined. The sample image includes at least an eye image. A second gaze direction of the sample image is determined according to the first coordinates and the second coordinates. Gaze direction detection is performed on the sample image by means of the sixth neural network to obtain a second detected gaze direction. The sixth neural network is trained according to the second gaze direction and the second detected gaze direction.

In some optional examples, determining the gaze direction of the driver in the driver image according to the head pose information to obtain the gaze direction information may include: determining a pupil edge location according to an eye image positioned by an eye key point in the face key points, and computing a pupil center location according to the pupil edge location; obtaining eyeball rotation angle information at a head pose corresponding to the head pose information according to the pupil center location and an eye center location; and determining the gaze direction of the driver according to the head pose information and the eyeball rotation angle information to obtain the gaze direction information.

Determining the pupil edge location according to the eye image positioned by the eye key point in the face key points may include: performing pupil edge location detection on the eye image in the image divided according to the face key points based on a seventh neural network, and obtaining the pupil edge location according to information output by the seventh neural network.

As one optional example, the eye image is cut and enlarged from the driver image and then provided to the seventh neural network for pupil positioning for implementing pupil key point detection, and the detected pupil key point is output. The pupil edge location is obtained according to the pupil key point output by the seventh neural network, and the pupil center location may be obtained by calculating the pupil edge location (for example, calculating the center location).

As one optional example, the eye center location may be obtained based on the upper eyelid line and the lower eyelid line. For example, the coordinate information of all key points of the upper eyelid line and the lower eyelid line are added, and then is divided by the number of all key points of the upper eyelid line and the lower eyelid line, and the coordinate information obtained after the division is used as the eye center location. In addition, other methods may also be used to obtain the eye center location. For example, the eye key point in the detected face key points is calculated to obtain the eye center location. The present disclosure does not limit the implementation of obtaining the eye center location.

In the embodiments, a more accurate pupil center location may be obtained by obtaining the pupil center location based on the pupil key point detection, and a more accurate eye center location may be obtained by obtaining the eye center location based on eyelid line positioning, so that more accurate gaze direction information may be obtained when the gaze direction is determined by using the pupil center location and the eye center location. In addition, the pupil center location is positioned by using pupil key point detection, and the gaze direction is determined by using the pupil center location and the eye center location, so that the implementation mode of determining the gaze direction is accurate and easily achieved.

In one optional example, the present disclosure may employ existing neural networks to implement detection of the pupil edge location and detection of the eye center location.

The seventh neural network may be pre-trained based on deep learning technology. In the embodiments, the detection of the pupil edge location is performed by using the seventh neural network to realize the accurate detection of pupil edge location, thereby improving the accuracy of gaze direction information.

In one optional example, when the parameter value of the gaze direction deviation degree is obtained according to the gaze direction information within a period of time, the parameter value of the gaze direction deviation degree is obtained according to the deviation angle of the gaze direction information relative to a reference gaze direction within a period of time.

The reference gaze direction is preset, or an average gaze direction determined based on the first N driver image frames in a video where the driver image is located is taken as the reference gaze direction. N is an integer greater than 1.

In the embodiments of the present disclosure, it is considered that the driver is in a daze state when the eyes are in an eye open state for a preset period of time. In one optional example, obtaining the parameter value of the daze degree according to the eye state information within a period of time may include: determining, according to the eye state information, that the driver is in a daze state when the eyes of the driver are in an eye open state for a preset period of daze time; and obtaining the parameter value of the daze degree according to the eye state information within a period of time. The period of time includes the preset period of daze time.

In the embodiments of the present disclosure, the head suddenly lowers from the normal head location and then returns to the normal head location (that is, the pitch angle in the head pose information changes from 0 degree during a normal driving state to a certain angle and then returns to 0 degree within a preset short period of time), it is considered as a nap nod. In one optional example, obtaining the parameter value of the nap degree according to the head location information within a period of time may include: determining, according to the head location information, that the driver is in a nap state when the head location of the driver has a deviation degree with respect to a preset reference head location reaching a preset deviation range within a first preset period of time and returns to the preset reference head location within a second preset period of time; and obtaining the parameter value of the nap degree according to the head location information within a period of time, where the period of time includes the first preset period of time and the second preset period of time.

In the embodiments of the present disclosure, the process that the mouth is in the closed state to the open state and then to the closed state is considered as a yawn action, and the time required for the yawn action is generally greater than 400 ms. In one optional example, obtaining the parameter value of the yawning degree according to the mouth state information within a period of time may include: determining, according to the mouth state information, that the driver completes a yawn action when the time that the mouth of the driver changes from a mouth closed state to a mouth open state and then returns to the mouth closed state is within a preset time range; and obtaining the parameter value of the yawning degree according to the mouth state information within a period of time. The period of time includes the time that the mouth of the driver changes from the mouth closed state to the mouth open state and then returns to the mouth closed state.

In some implementations, determining the fatigue state detection result according to the parameter value of the index for representing the fatigue state of the driver includes: determining that the fatigue state detection result is a fatigue state when any one or more of the parameter values of the indexes for representing the fatigue state of the driver satisfy a predetermined fatigue condition; and/or, determining that the fatigue state detection result is a non-fatigue state when none of the parameter values of the indexes for representing the fatigue state of the driver satisfies the predetermined fatigue condition.

The predetermined fatigue condition includes multiple fatigue level conditions. Accordingly, determining that the fatigue state detection result is the fatigue state when any one or more of the parameter values of the indexes for representing the fatigue state of the driver satisfy the predetermined fatigue condition includes: determining a fatigue state level according to the fatigue level condition satisfied by the parameter value of the index for representing the fatigue state of the driver; and taking the determined fatigue state level as the fatigue state detection result.

In the embodiments, the fatigue state detection result may be represented as the fatigue driving degree. The fatigue driving degree may, for example, include: a normal driving level (i.e., a non-fatigue state level) and a fatigue driving level (i.e., a fatigue state level), where the fatigue driving level may be one fatigue state level, or may be divided into multiple different fatigue state levels, for example, the foregoing fatigue driving level may be divided into a fatigue prompt level (also called a mild fatigue level) and a fatigue warning level (also called a severe fatigue level). In addition, the fatigue driving degree may also be divided into more levels, for example, a mild fatigue level, a moderate fatigue level, and a severe fatigue level and the like. The present disclosure does not limit different fatigue state levels included in the fatigue driving degree.

In one optional example, each fatigue state level included in the fatigue driving degree corresponds to a fatigue level condition, and a fatigue state level corresponding to a fatigue level condition that satisfied by the parameter value of the index for representing the fatigue state of the driver, or the non-fatigue state where the parameter value of the index for representing the fatigue state of the driver does not satisfy any of the fatigue level conditions is determined as the fatigue driving degree.

In one optional example, the preset conditions corresponding to the normal driving level (i.e., the non-fatigue state) (that is, the predetermined fatigue conditions are not satisfied) includes:

condition 20a, there is no phenomenon of eye semi-closure and eye closure; and condition 20b, there is no phenomenon of yawning.

In the case where the conditions 20a and 20b are both satisfied, the driver is currently in the normal driving level (i.e., the non-fatigue state).

In one optional example, the fatigue level conditions corresponding to the fatigue prompt level may include:

condition 20c, the phenomenon of eye semi-closure exists; and condition 20d, the phenomenon of yawning exists.

In the case where any of the conditions 20a and 20d is satisfied, the driver is currently in the fatigue prompt level.

In one optional example, the fatigue level conditions corresponding to the fatigue warning level may include:

condition 20d: the phenomenon of eye closure exists, or the number of eye closures within a period of time reaches a preset number of times, or the time of eye closure within a period of time reaches a preset time; and condition 20e: the number of yawns within a period of time reaches a preset number of times.

In the case where any of the conditions 20d and 20e is satisfied, the driver is currently in the fatigue warning level.

In some implementations, determining the distraction state detection result according to the parameter value of the index for representing the distraction state of the driver includes: determining that the distraction state detection result is a distraction state when any one or more of the parameter values of the indexes for representing the distraction state of the driver satisfy a predetermined distraction condition; and/or, determining that the distraction state detection result is a non-distraction state when none of the parameter values of the indexes for representing the distraction state of the driver satisfies the predetermined distraction condition.

The predetermined distraction condition includes multiple distraction level conditions. Accordingly, determining that the distraction state detection result is the distraction state when any one or more of the parameter values of the indexes for representing the distraction state of the driver satisfy the predetermined distraction condition may include: determining the distraction state level according to the distraction level condition satisfied by the parameter value of the index for representing the distraction state of the driver; and taking the determined distraction state level as the distraction state detection result.

In the embodiments, the distraction state detection result may be represented as a distraction driving degree. The distraction driving degree may include, for example, the driver's concentration concentrated (the driver's attention is not distracted, i.e., the non-distraction state), and the driver's concentration distracted (the distraction state). For example, if the gaze direction deviation angle, the face orientation deviation angle, and the head location deviation angle are all smaller than the first preset angle, and the eye open duration is shorter than a first preset duration, the driver's concentration is concentrated (the driver's attention is not distracted, i.e., the non-distraction state). A driver distraction level may, for example, include that the driver's attention is slightly distracted, and the driver's attention is moderately distracted, the driver's attention is severely distracted and the like. The driver distraction level may be determined by the distraction level condition satisfied by the parameter value of the index for representing the driver distraction state. For example, if any of the gaze direction deviation angle, the face orientation deviation angle, and the head location deviation angle is not less than the preset angle, and the duration is not greater than the first preset duration and less than the second preset duration, or the eye open duration is not greater than the first preset duration and less than the second preset duration, the driver's attention is slightly distracted. If either of the gaze direction deviation angle and the face orientation deviation angle is not less than the preset angle, and the duration is not greater than the second preset duration and less than the third preset duration, or the eye open duration is not greater than the second preset duration and less than the third preset duration, the driver's attention is moderately distracted. If either of the gaze direction deviation angle and the face orientation deviation angle is not less than the preset angle, and the duration is not less than the third preset duration, and the eye open duration is not less than the third preset duration, the driver's attention is severely distracted.

Figure 3:
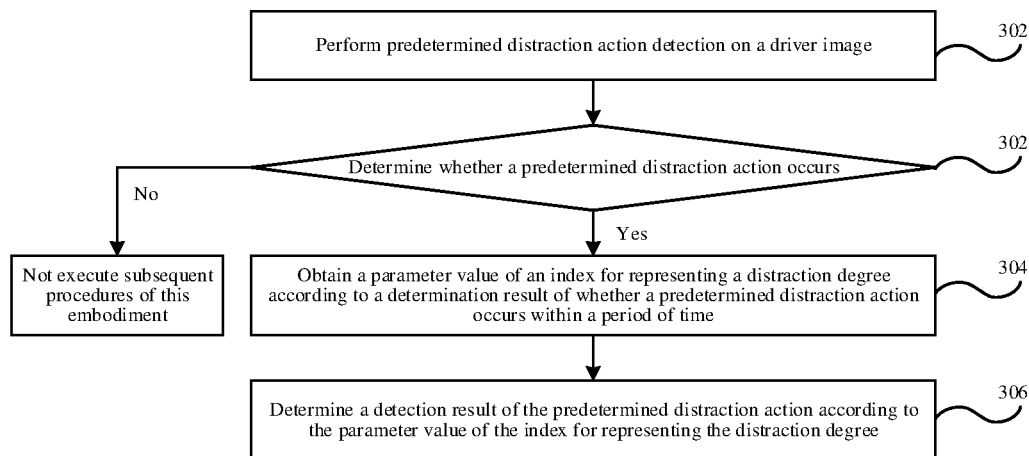
FIG. 3 is a flowchart of one embodiment of performing predetermined distraction action detection on a driver image in embodiments of the present disclosure.

FIG. 3 is a flowchart of yet another embodiment of a driving state detection method according to the present disclosure. Compared to the foregoing FIG. 1 or 2, the driving state detection method of the embodiments further includes a related operation for performing predetermined distraction action detection on the driver image. As shown in FIG. 3, the embodiment of performing predetermined distraction action detection on the driver image includes the following steps.

At 302, predetermined distraction action detection is performed on the driver image to determine whether a predetermined distraction action occurs.

The predetermined distraction action in the embodiments of the present disclosure may be any distraction action that may distract the driver, for example, a smoking action, a drinking action, an eating action, a calling action, an entertainment action, a makeup action and the like. The eating action is, for example, eating fruit, snacks and other food. The entertainment action is any action executed with the aid of an electronic device, for example, sending messages, playing games, singing and the like. The electronic device is for example a mobile terminal, a handheld computer, a game machine and the like.

In one optional example, operation 302 may be executed by a processor by invoking a corresponding instruction stored in a memory, or may be performed by a second detection module run by the processor.

If a predetermined distraction action occurs, operation 304 is executed. Otherwise, if no predetermined distraction action occurs, subsequent process of the embodiments is not executed.

At 304, the parameter value of the index for representing the distraction degree of the driver is obtained according to a determination result indicating whether the predetermined distraction action occurs within a period of time.

The parameter value of the distraction degree may include, but is not limited to, any one or more of the following: the number of occurrences of the predetermined distraction action, duration of the predetermined distraction action, or a frequency of the predetermined distraction action, etc., e.g., the number of occurrences, duration and frequency of the smoking action; the number of occurrences, duration and frequency of the drinking action; the number of occurrences, duration and frequency of the calling action, and the like.

In one optional example, operation 304 may be executed by a processor by invoking a corresponding instruction stored in a memory, or may be performed by a first obtaining module run by the processor.

At 306, a detection result of the predetermined distraction action of the driver is determined according to the parameter value of the index for representing the distraction degree of the driver.

In one optional example, operation 306 may be executed by a processor by invoking a corresponding instruction stored in a memory, or may be performed by a fourth determination module run by the processor.

In some implementations, in operation 302, performing predetermined distraction action detection on the driver image to determine whether the predetermined distraction action occurs includes:

extracting features of the driver image;

extracting multiple candidate boxes that may include the predetermined distraction action based on the features;

determining an action target box based on the multiple candidate boxes, where the action target box includes a local region of a face and an action interaction object, or further selectively includes a hand region; where the local region of the face may, for example, include, but is not limited to, any one or more of the following: a mouth region, an ear region, or an eye region, etc.; and/or, the action interaction object may, for example, include, but is not limited to, any one or more of the following: a container, a cigarette, a mobile phone, food, a tool, a beverage bottle, eyeglasses, or a mask, etc.; and performing classification detection on the predetermined distraction action based on the action target box to determine whether the predetermined distraction action occurs.

In some other implementations, in operation 302, performing predetermined distraction action detection on the driver image to determine whether the predetermined distraction action occurs includes: performing target object detection corresponding to the predetermined distraction action on the driver image to obtain a target object bounding box; and determining whether the predetermined distraction action occurs according to the target object bounding box.

The embodiments provide an implementation scheme for performing predetermined distraction action detection on the driver. By detecting the target object corresponding to the predetermined distraction action and determining whether the predetermined distraction action occurs according to the bounding box for the detected target object, whether the driver is distracted may be determined, which is contributive to obtaining an accurate result of the driver's predetermined distraction action detection so as to improve the accuracy of results of driver state detection.

For example, when the predetermined distraction action is a smoking action, performing predetermined distraction action detection on the driver image to determine whether the predetermined distraction action occurs includes: performing face detection on the driver image by means of an eighth neural network to obtain a face bounding box, and extracting feature information of the face bounding box; and determining whether the smoking action occurs by means of the eighth neural network according to the feature information of the face bounding box.

For another example, when the predetermined distraction action is an eating action/drinking action/calling action/entertainment action (i.e., an eating action and/or a drinking action and/or a calling action and/or an entertainment action)/makeup action, performing predetermined distraction action detection on the driver image to determine whether the predetermined distraction action occurs includes: performing preset target object detection corresponding to the eating action/drinking action/calling action/entertainment action/makeup action on the driver image by means of a ninth neural network to obtain a bounding box of a preset target object, where the preset target object includes hands, mouth, eyes, and the action interaction object, and the action interaction object includes any one or more types of the following: a container, food, an electronic device, cosmetics, etc.; and determining whether the predetermined distraction action occurs according to the bounding box of the preset target object, where the determination result of whether the predetermined distraction action occurs includes one of the following: no eating action/drinking action/calling action/entertainment action/makeup action occurs; the eating action occurs; the drinking action occurs; the calling action occurs; the entertainment action occurs; and the makeup action occurs.

In some optional examples, when the predetermined distraction action is the eating action/drinking action/calling action/entertainment action (i.e., an eating action and/or a drinking action and/or a calling action and/or an entertainment action)/makeup action, determining whether the predetermined distraction action occurs according to the bounding box of the preset target object includes: determining whether the predetermined distraction action occurs according to whether a hand bounding box, a mouth bounding box, an eye bounding box, and an action interaction object bounding box are detected, whether the hand bounding box overlaps the action interaction object bounding box, the type of the action interaction object, and whether the distance between the action interaction object bounding box and the mouth bounding box or the eye bounding box satisfies a preset condition.

Optionally, if the hand bounding box overlaps the action interaction object bounding box, the type of the action interaction object is a container or food, and the action interaction object bounding box overlaps the mouth bounding box, it is determined that the eating action, driving action or makeup action occurs; and/or, if the hand bounding box overlaps the action interaction object bounding box, the type of the action interaction object is an electronic device, and the minimum distance between the action interaction object bounding box and the mouth bounding box is less than a first preset distance, or the minimum distance between the action interaction object bounding box and the eye bounding box is less than a second preset distance, it is determined that the entertainment action or calling action occurs.

In addition, if the hand bounding box, the mouth bounding box, and any action interaction object bounding box are not detected simultaneously, and the hand bounding box, the eye bounding box, and any action interaction object bounding box are not detected simultaneously, it is determined that the determination result of whether the predetermined distraction action occurs is that no eating action, drinking action, calling action, entertainment action, and makeup action is detected; and/or, if the hand bounding box does not overlap the action interaction object bounding box, it is determined that the determination result of whether the predetermined distraction action occurs is that no eating action, drinking action, calling action, entertainment action, and makeup action is detected; and/or, if the type of the action interaction object is a container or food, and the action interaction object bounding box does not overlap the mouth bounding box, and/or, the type of the action interaction object is an electronic device, and the minimum distance between the action interaction object bounding box and the mouth bounding box is not less than the first preset distance, or the minimum distance between the action interaction object bounding box and the eye bounding box is not less than the second preset distance, it is determined that the determination result of whether the predetermined distraction action occurs is that no eating action, drinking action, calling action, entertainment action, and makeup action is detected.

In the foregoing examples, the eighth neural network and the ninth neural network may perform predetermined distraction action detection on the driver image and output the probabilities of various predetermined distraction actions.

The distraction action that is greater than a preset probability threshold and has the highest probability value may be selected as the detection result of the predetermined distraction action. If the probabilities of various predetermined distraction actions are all lower than the preset probability threshold, it is considered that no predetermined distraction action is detected.

In addition, in the foregoing embodiments of performing predetermined distraction action detection on the driver image, the method further includes: if determining that a predetermined distraction action occurs, providing a prompt about the detected distraction action, for example, when the smoking action is detected, providing a prompt about the detection of smoking; when the drinking action is detected, providing a prompt about the detection of drinking; and when the calling action is detected, providing a prompt about the detection of calling, to remind the driver to concentrate on driving.

In addition, in the foregoing embodiments of performing predetermined distraction action detection on the driver image, if determining that the predetermined distraction action occurs, the method further includes:

determining the distraction action level according to the distraction action level condition satisfied by the parameter value of the index for representing the distraction degree; and taking the determined distraction action level as the detection result of the predetermined distraction action.

In the embodiments, the detection result of the driver's predetermined distraction action includes that: the predetermined distraction action does not occur (that is, the predetermined distraction action is not detected, which may also be referred to as a concentrated driving level), and the predetermined distraction action occurs (that is, the predetermined distraction action is detected). In addition, the detection result of the driver's predetermined distraction action may also be a distraction action level, e.g., a distraction prompt level (also referred to as a mild distraction level) and a distraction warning level (also referred to as a severe distraction level). In addition, the distraction action level may also be divided into more levels, e.g., a non-distraction level, a mild distraction level, a moderate distraction level, and a severe distraction level. In addition, the distraction action levels of the embodiments of the present disclosure may also be divided according to other situations, and are not limited to the foregoing level division.

The distraction action levels may be determined by means of the distraction action level conditions satisfied by the parameter values of the indexes for representing the distraction degree. For example, the detection result of the predetermined distraction action of the driver may be that no predetermined distraction action occurs. If it is determined that the predetermined distraction action occurs, and the duration of the predetermined distraction action is detected to be less than the first preset duration, and the frequency thereof is less than a first preset frequency, the distraction action level is the mild distraction driving level; and if it is detected that the duration of the predetermined distraction action is greater than the first preset duration, and/or the frequency is greater than the first preset frequency, the distraction action level is the severe distraction driving level.

In addition, in the foregoing embodiments, the method further includes: in response to the detection result of the predetermined distraction action satisfying a predetermined alarm condition, outputting alarm information corresponding to the detection result of the predetermined distraction action that satisfies the predetermined alarm condition.

In some implementations of the foregoing embodiments, in response to one of the fatigue state detection result and the distraction state detection result satisfying the predetermined alarm condition, outputting the alarm information of the corresponding detection result that satisfies the predetermined alarm condition includes: in response to one of the fatigue state detection result, the distraction state detection result, and the detection result of the predetermined distraction action satisfying the predetermined alarm condition, outputting alarm information of the corresponding detection result that satisfies the predetermined alarm condition.

In some implementations of the foregoing embodiments, in response to both the fatigue state detection result and the distraction state detection result satisfying the predetermined alarm condition, outputting the alarm information of the fatigue state detection result that satisfies the predetermined alarm condition includes: in response to the fatigue state detection result, the distraction state detection result, and the detection result of the predetermined distraction motion all satisfying the predetermined alarm condition, outputting alarm information of the fatigue state detection result that satisfies the predetermined alarm condition; and/or, in response to two of the fatigue state detection result, the distraction state detection result, and the detection result of the predetermined distraction action satisfying the predetermined alarm condition, outputting the alarm information according to a preset alarm strategy.

For example, in some optional examples, in response to two of the fatigue state detection result, the distraction state detection result, and the detection result of the predetermined distraction action satisfying the predetermined alarm condition, outputting the alarm information according to the preset alarm strategy includes:

in response to the fatigue state detection result and the detection result of the predetermined distraction action satisfying the predetermined alarm condition, outputting alarm information of the fatigue state detection result that satisfies the predetermined alarm condition; and/or, in response to two of the distraction state detection result and the detection result of the predetermined distraction action satisfying the predetermined alarm condition, outputting alarm information of the distraction state detection result that satisfies the predetermined alarm condition, or outputting alarm information corresponding to the detection result of the predetermined distraction action that satisfies the predetermined alarm condition.

In addition, in further implementations, the alarm information corresponding to other detection results that satisfy the predetermined alarm condition may be suppressed within a preset period of time after outputting the alarm information corresponding to the detection result of the predetermined distraction action that satisfies the predetermined alarm condition, so that the purpose of prompting a driver to drive safely can be achieved, and the interference to the normal driving of the driver caused by repeatedly outputting a variety of prompt/warning information can also be avoided, thereby improving driving safety.

In some implementations, when the fatigue state detection result is the fatigue state level, outputting the alarm information of the fatigue state detection result that satisfies the predetermined alarm condition includes: outputting corresponding prompt or warning information according to the fatigue state level; and/or, when the distraction state detection result is the distraction state level, outputting prompt/warning information corresponding to the distraction state detection result that satisfies the predetermined alarm condition includes: outputting corresponding prompt or warning information according to the distraction state level; and/or, when the detection result of the predetermined distraction action is the distraction action level, outputting alarm information corresponding to the detection result of the predetermined distraction action that satisfies the predetermined alarm condition includes: outputting corresponding prompt or warning information according to the distraction action level.

For example, based on the foregoing embodiments, outputting the prompt/warning information corresponding to the fatigue state detection result when the detection result of fatigue state is the fatigue state includes the following.

If it is found, based on the head location information, that the driver is doing a nap nodding action, it is determined that the fatigue state detection result is the fatigue state, and fatigue prompt information is output. If the driver keeps napping and nodding, the driver's fatigue level continues to deepen (that is, the fatigue state level is increased), where the fatigue levels are the mild fatigue level, the moderate fatigue level, and the severe fatigue level sequentially, and the fatigue alarm information is output every X seconds, until the fatigue state detection result is a non-fatigue state, that is, the driver resumes a normal driving state, where X is a value greater than 0.

If it is found, based on the eye state information, that the duration of eye closure of the driver reaches a certain duration or the blink frequency reaches a certain value, it is determined that the fatigue state detection result is the fatigue state, and fatigue prompt information is output. If the duration of eye closure of the driver increases continuously or the blink frequency is always too high, the driver's fatigue level continues to deepen (that is, the fatigue state level is increased), where the fatigue levels are the mild fatigue level, the moderate fatigue level, and the severe fatigue level sequentially, and the fatigue alarm information is output every X seconds, until the fatigue state detection result is a non-fatigue state, that is, the driver resumes a normal driving state.

If it is found, based on the mouth state information, that the driver is doing a yawn action, it is determined that the fatigue state detection result is the fatigue state, and fatigue prompt information is output. If the driver keeps yawning, the driver's fatigue level continues to deepen (that is, the fatigue state level is increased), where the fatigue levels are the mild fatigue level, the moderate fatigue level, and the severe fatigue level sequentially, and the fatigue alarm information is output every X seconds, until the fatigue state detection result is a non-fatigue state, that is, the driver resumes a normal driving state.

If it is found, based on the head location information, the eye state information, and the mouth state information, that the driver is in two or more states of four behaviors, i.e., napping and nodding, the duration of eye closure reaches a certain period of time, the blink frequency reaches a certain value, and yawning, etc., it is determined that the driver is in a severe fatigue level, and the fatigue alarm information is output every X seconds until the fatigue state detection result is a non-fatigue state, that is, the driver resumes a normal driving state.

For example, based on the foregoing embodiments, outputting the prompt/warning information corresponding to the distraction state detection result when the detection result of distraction state is the distraction state includes the following.

The distraction state detection result is determined as the distraction state based on the head location information if the deviation angle of the head location of the driver exceeds a preset range, and the deviation time exceeds Y seconds, and distraction prompt information is output, where Y is a value greater than 0. As the deviation time that the deviation degree of the head location of the driver exceeds the preset range continues to increase, the distraction degree of the driver continues to deepen (that is, the distraction state level is increased), where the distraction degrees are sequentially that the driver's attention is slightly distracted, and the driver's attention is moderately distracted, the driver's attention is severely distracted and the like, and the distraction alarm information is output every X seconds until the distraction state detection result is a non-distraction state, that is, the driver resumes a normal driving state.

The distraction state detection result is determined as the distraction state based on the head location information and the gaze direction information if the deviation angle of the head location of the driver does not exceed the preset range, but the gaze direction deviation angle exceeds a preset gaze safety range, and the duration exceeds Y seconds, and distraction prompt information is output. Since the duration that the deviation degree of the gaze direction exceeding the preset gaze safety range continues to increase, the distraction degree of the driver continues to deepen (that is, the distraction state level is increased), where the distraction degrees are sequentially that the driver's attention is slightly distracted, and the driver's attention is moderately distracted, the driver's attention is severely distracted and the like, and the distraction alarm information is output every X seconds until the distraction state detection result is a non-distraction state, that is, the driver resumes a normal driving state.

The distraction state detection result is determined as the distraction state based on the head location information, the gaze direction information, and the eye open/closed state information if the deviation angle of the head location of the driver does not exceed the preset range, and the deviation angle of the gaze direction does not exceed the preset gaze safety range, but it is detected that the driver is in a daze state, and distraction prompt information is output. Since the distraction degree of the driver continues to deepen (that is, the distraction state level is increased), where the distraction degrees are sequentially that the driver's attention is slightly distracted, and the driver's attention is moderately distracted, the driver's attention is severely distracted and the like, and the distraction alarm information is output every X seconds until the distraction state detection result is a non-distraction state, that is, the driver resumes a normal driving state.

In addition, in the foregoing embodiments of the present disclosure, the method further includes: in response to any one or more of the fatigue state detection result, the distraction state detection result, and the detection result of the predetermined distraction action satisfying a predetermined driving mode switching condition, switching the driving mode to an automatic driving mode.

In some implementations, the driving mode may be switched to the automatic driving mode when the fatigue state level and/or the distraction state level and/or the distraction action level satisfies the predetermined driving mode switching condition, so as to implement safe driving and avoid road traffic accidents.

In the embodiments, when the predetermined driving mode switching condition is satisfied, the driving mode is switched to the automatic driving mode, and the safe driving of the vehicle is realized by means of the automatic driving mode to avoid road traffic accidents.

In addition, in the embodiments of the present disclosure, after the detection results of the driver states are determined, the detection results of the driver states may also be output, for example, the detection results of the driver states are output locally and/or the detection results of the driver states are output remotely. The detection results of the driver states are output locally, i.e., the detection results of the driver states are output by a driver state detection apparatus or a driver monitoring system, or the detection results of the driver states are output to a central control system in the vehicle, so that intelligent driving control is performed on the vehicle based on the detection results of the driver states. The detection results of the driver states are output remotely, for example, the detection results of the driver states may be sent to a cloud server or a management node so that the cloud server or the management node collects, analyzes, and/or manages the detection results of the driver states, or the vehicle is remotely controlled based on the detection results of the driver states.

Furthermore, in the foregoing embodiments, the detection results of the driver states may also be stored in the user information of the driver in the database, and the driving state detection result of the driver is recorded to facilitate subsequent query of the driving state detection result of the driver, or analysis and statistical collection about the driving behavior habits of the driver.

In addition, in another embodiment of the driving state detection method of the present disclosure, the method further includes: performing image acquisition by means of an infrared camera, for example, performing image acquisition by means of an infrared camera deployed in at least one location within the vehicle to obtain a driver image.

The driver image in the embodiments of the present disclosure is generally an image frame in a video captured by the infrared camera (including a near-infrared camera and the like) from a cab.

The wavelength of the infrared camera includes 940 nm or 850 nm. The infrared camera may be provided in any location where the driver may be photographed in the cab of the vehicle, for example, the infrared camera may be deployed in any one or more of the following locations: a location above or near a dashboard, a location above or near a center console, an A-pillar or nearby location, or a rearview mirror or nearby location. For example, in some optional examples, the infrared camera may be provided in a location above the dashboard (such as the location right above) and facing directly forward, may be provided in a location above the center console (for example, in the middle location) and facing directly forward, may also be provided on the A-pillar (for example, it may be attached to the glass close to the A-pillar) and facing the face of the driver, and may also be provided on the rearview mirror (for example, it may be attached to the glass above the rearview mirror) and facing the face of the driver. When the infrared camera is provided in a location above the dashboard and above the center console, the optional location thereof is determined according to the view of the camera and the location of the driver, for example, when it is provided in the position above the dashboard, the infrared camera may face the driver to ensure that the camera view is not blocked by the steering wheel; when it is provided in the location above the center console, if the view of the camera is large enough, the infrared camera may be aimed at the rear to ensure that the driver is in the field of view of the camera, and if the view is not large enough, the infrared camera may face the driver to ensure that the driver appears in the view of the infrared camera.

Since the light in the region where the driver is located (for example, in the car or in the cab) is often complicated, the quality of the driver image captured by an infrared camera tends to be better than the quality of the driver image captured by an ordinary camera, especially at night or in a dark environment such as a cloudy sky or a tunnel, and the quality of the driver image captured by the infrared camera is usually significantly better than the quality of the driver image captured by the ordinary camera, which is beneficial to improve the accuracy of driver distraction state detection and distraction action detection, so as to improve the accuracy of driving state monitoring.

In the embodiments of the present disclosure, an easy-to-deploy and easy-to-use infrared camera is configured to obtain the driver image in real time. The camera may be installed in various locations, for example, on the center console, dashboard, A-pillar, and interior rearview mirror, etc. of the vehicle. By using a neural network based on a deep learning technology to implement fatigue state detection and distraction state detection for the driver, the robustness is good, the application range is wide, and a better driving state detection effect can be achieved in day, night, strong light, low light and other scenarios.

Optionally, in practical applications, the original image captured by the camera often cannot be directly used due to various restrictions and random interference. In some optional examples of the present disclosure, gray-scale pre-processing may be performed on the driver image captured by the infrared camera, and a red, green and blue (RGB) 3-channel image is converted into a gray-scale image, and then the operations such as identity authentication, distraction state detection and distraction action detection of the driver are performed to improve the accuracy of identity authentication, distraction state detection and distraction action detection.

In some implementations, for example, image acquisition is performed by an infrared camera to obtain a driver image in the following scenarios:

performing image acquisition by means of the infrared camera when the vehicle is in a driving state, to obtain the driver image; and/or, performing image acquisition by means of the infrared camera when a running speed of the vehicle exceeds a preset speed, to obtain the driver image; and/or, performing image acquisition by means of the infrared camera after detecting that the vehicle is powered on, to obtain the driver image; and/or, performing image acquisition by means of the infrared camera when a start instruction of the vehicle is detected, to obtain the driver image; and/or, performing image acquisition by means of the infrared camera when a control instruction (for example, accelerating, accelerating, steering, opening or closing windows, turning on or off the air conditioner, turning on or off the entertainment systems, or the like) to the vehicle or a component or system in the vehicle is detected, to obtain the driver image.

In some of the application scenarios, when the driver starts the vehicle and starts the driving state monitoring apparatus or the driver monitoring system, the infrared camera is started to acquire the driver image for driving state detection.

The driving state detection method of the foregoing embodiments of the present application includes: performing image acquisition by an infrared (including near-infrared) camera to obtain an driver image, and then sending the driver image to an electronic device such as a single chip microcomputer, FPGA, ARM, CPU, GPU, microprocessor, a smart mobile phone, a notebook computer, a tablet computer (PAD), a desktop computer, or a server which can load the neural network for implementation. The electronic device can run a computer program (also called a program code), which may be stored in a computer readable storage medium such as a flash memory, a cache, a hard disk, or an optical disk.

Any driving state analysis method provided by the embodiments of the present disclosure may be executed by any appropriate device with a data processing capability, including, but not limited to, a terminal device, a server, and the like. Alternatively, any driving state analysis method provided in the embodiments of the present disclosure is executed by a processor, for example, any driving state analysis method mentioned in the embodiments of the present disclosure is executed by the processor by invoking corresponding instructions stored in a memory. Details are not described below again.

A person of ordinary skill in the art may understand that all or some steps for implementing the foregoing embodiments of the method are achieved by a program by instructing related hardware; the foregoing program can be stored in a computer-readable storage medium; when the program is executed, steps including the foregoing embodiments of the method are executed. Moreover, the foregoing storage medium includes various media capable of storing program codes, such as a Read-Only Memory (ROM), a Random Access Memory (RAM), a magnetic disk, or an optical disk.

Figure 4:
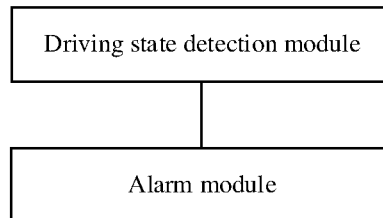
FIG. 4 is a schematic structural diagram of one embodiment of a driving state analysis apparatus according to the present disclosure.

FIG. 4 is a schematic structural diagram of one embodiment of a driving state analysis apparatus according to the present disclosure. The driving state analysis apparatus of the embodiments may be configured to implement the foregoing driving state analysis method of the embodiments of the present disclosure. As shown in FIG. 4, the driving state analysis apparatus in the embodiments includes: a driving state detection module, configured to perform fatigue state detection and distraction state detection for a driver on a driver image to obtain a fatigue state detection result and a distraction state detection result; and an alarm module, configured to: in response to one of the fatigue state detection result and the distraction state detection result satisfying a predetermined alarm condition, output alarm information of the corresponding detection result that satisfies the predetermined alarm condition; and/or, in response to both the fatigue state detection result and the distraction state detection result satisfying the predetermined alarm condition, output alarm information of the fatigue state detection result that satisfies the predetermined alarm condition.

In some implementations, the alarm module configured to output, in response to one of the fatigue state detection result and the distraction state detection result satisfying the predetermined alarm condition, alarm information of the corresponding detection result that satisfies the predetermined alarm condition, is configured to: output prompt/warning information corresponding to the fatigue state detection result when the fatigue state detection result is a fatigue state; and/or, output prompt/warning information corresponding to the distraction state detection result when the distraction state detection result is a distraction state.

Based on the driving state analysis apparatus provided by the foregoing embodiments of the present disclosure, joint detection of the driver's fatigue state and the driver's distraction state can be implemented on a driver image; when one of the fatigue state detection result and the distraction state detection result satisfies a predetermined alarm condition, alarm information of a corresponding detection result that satisfies the predetermined alarm condition is output; and/or, when both the fatigue state detection result and the distraction state detection result satisfy the predetermined alarm condition, alarm information of the fatigue state detection result that satisfies the predetermined alarm condition is output, in order to prompt the driver to pay attention, thus improving driving safety and reducing the incidence of road traffic accidents. Moreover, when both the fatigue state detection result and the distraction state detection result satisfy the predetermined alarm condition, only the alarm information of the fatigue state detection result that satisfies the predetermined alarm condition is output, so that the distraction and disgust of the driver caused by too many or too frequent alarms may be avoided. The present disclosure improves the safety of assisted driving and user experience by optimizing the alarm strategy.

In some other embodiments, the alarm module is further configured to: suppress alarm information corresponding to other detection results that satisfy the predetermined alarm condition within a preset period of time after outputting the alarm information corresponding to the fatigue state detection result; and/or, suppress the alarm information corresponding to other detection results that satisfy the predetermined alarm condition within a preset period of time after outputting the alarm information corresponding to the distraction state detection result.

The embodiments can further avoid the distraction and disgust of the driver caused by too many or too frequent alarms, and further improve the safety of assisted driving and user experience.

Figure 5:
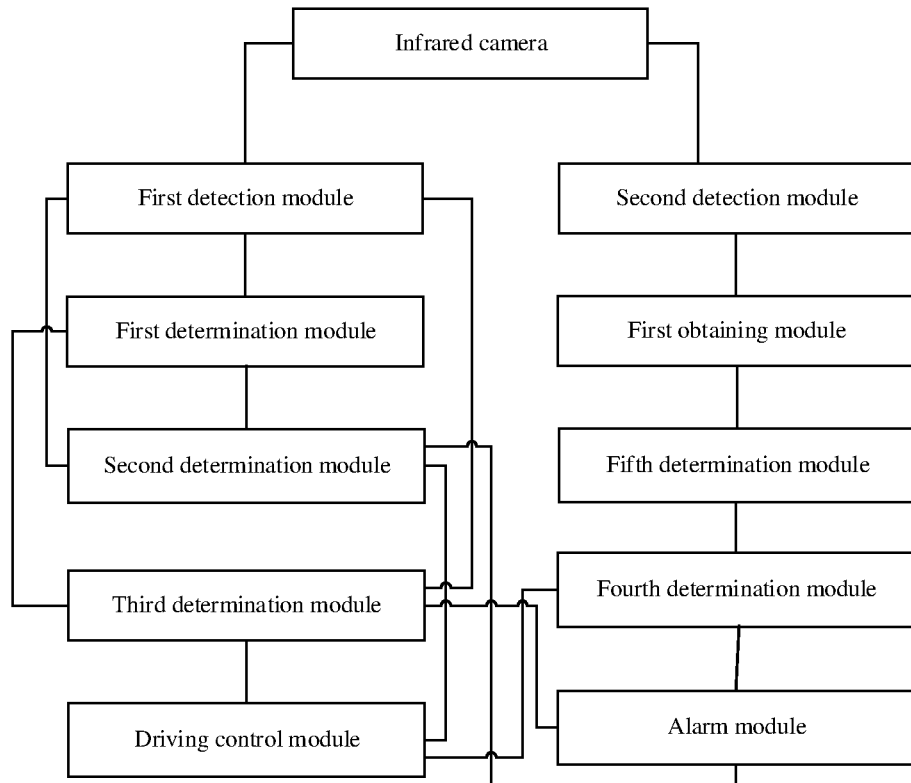
FIG. 5 is a schematic structural diagram of another embodiment of a driving state analysis apparatus according to the present disclosure.

FIG. 5 is a schematic structural diagram of one embodiment of a driving state analysis apparatus according to the present disclosure. As shown in FIG. 5, compared with the embodiment shown in FIG. 4, the driving state analysis apparatus in this embodiment further includes: a first determination module, configured to determine whether a deviation angle of a head location of the driver in the driver image exceeds a preset range. Accordingly, in this embodiment, the driving state detection module is configured to: if the deviation angle of the head location of the driver exceeds the preset range, perform distraction state detection for the driver on the driver image to obtain the distraction state detection result; and/or, if the deviation angle of the head location of the driver does not exceed the preset range, execute operations of performing fatigue state detection and distraction state detection for the driver on the driver image to obtain the fatigue state detection result and the distraction state detection result.

As shown in FIG. 5, in some implementations, the driving state detection module includes: a first detection module, configured to perform head pose detection, eye state detection, and/or mouth state detection on the driver image to obtain head pose information, eye state information, and/or mouth state information; a second determination module, configured to determine the distraction state detection result of the driver according to the head pose information and/or the eye state information; and a third determination module, configured to determine the fatigue state detection result of the driver according to the head pose information, the eye state information, and/or the mouth state information.

In some optional examples, the second determination module includes: a first determination unit, configured to determine a parameter value of an index for representing the distraction state of the driver according to the head pose information and/or the eye state information; and a second determination unit, configured to determine the distraction state detection result of the driver according to the parameter value of the index for representing the distraction state of the driver.

In some optional examples, the third determination module includes: a third determination unit, configured to determine a parameter value of an index for representing the fatigue state of the driver according to the head pose information, the eye state information, and/or the mouth state information; and a fourth determination unit, configured to determine the fatigue state detection result of the driver according to the parameter value of the index for representing the fatigue state of the driver.

In some optional examples, the first detection module includes: a key point detection unit, configured to perform face key point detection on the driver image; and a first obtaining unit, configured to obtain the head pose information, the eye state information, and/or the mouth state information according to the detected face key points.

In some optional examples, the first obtaining unit configured to obtain the head pose information according to the detected face key points, is configured to obtain the head pose information by means of a first neural network based on the face key points.

In some optional examples, the first obtaining unit configured to obtain the eye state information according to the detected face key points, is configured to: determine an eye region image in the driver image according to the face key points; perform detections of an upper eyelid line and a lower eyelid line on the eye region image based on a second neural network; and determine eye open/closed state information of the driver according to the spacing between the upper eyelid line and the lower eyelid line, where the eye state information includes the eye open/closed state information.

In some optional examples, the first obtaining unit configured to obtain the eye state information according to the detected face key points, is configured to: determine an eye region image in the driver image according to the face key points; and perform eye open/closed classification processing on the eye region image based on a third neural network to obtain an eye open classification result or an eye closed classification result, where the eye state information includes an eye open state or an eye closed state.

In some optional examples, the first obtaining unit configured to obtain the mouth state information according to the detected face key points, is configured to: determine a mouth region image in the driver image according to the face key points; perform detections of an upper lip line and a lower lip line on the mouth region image based on a fourth neural network; and determine mouth open/closed state information of the driver according to the spacing between the upper lip line and the lower lip line, where the mouth state information includes the mouth open/closed state information.

In some optional examples, the first obtaining unit configured to obtain the mouth state information according to the detected face key points, is configured to: determine a mouth region image in the driver image according to the face key points; and perform mouth open/closed classification processing on the mouth region image based on a fifth neural network to obtain a mouth open classification result or a mouth closed classification result, where the mouth state information includes a mouth open state or a mouth closed state.

In some optional embodiments, the third determination unit is configured to determine the parameter value of the index for representing the fatigue state of the driver according to the head pose information, the eye state information, and the mouth state information.

In some optional examples, the first determination unit is configured to: determine the head location of the driver in the driver image according to the head pose information to obtain head location information, and obtain a parameter value of a head location deviation degree according to the head location information within a period of time; and/or, determine face orientation of the driver in the driver image according to the head pose information to obtain face orientation information, and obtain a parameter value of a face orientation deviation degree according to the face orientation information within a period of time; and/or, determine a gaze direction of the driver in the driver image according to the head pose information to obtain gaze direction information, and obtain a parameter value of a gaze direction deviation degree according to the gaze direction information within a period of time; or determine an eye region image in the driver image according to the face key points, obtain gaze direction information of the driver in the eye region image based on a sixth neural network, and obtain a parameter value of a gaze direction deviation degree according to the gaze direction information within a period of time; and/or, obtain a parameter value of a daze degree according to the eye state information within a period of time.

In some optional examples, the third determination unit is configured to: determine the head location of the driver in the driver image according to the head pose information to obtain the head location information, and obtain a parameter value of a nap degree according to the head location information within a period of time; and/or, obtain a parameter value of an eye closure degree according to the eye state information within a period of time; and/or, obtain a parameter value of a blink degree according to the eye state information within a period of time; and/or, obtain a parameter value of a yawning degree according to the mouth state information within a period of time.

In some implementations, the index for representing the fatigue state of the driver includes any one or more of the following: the nap degree, the eye closure degree, the blink degree, or the yawning degree; and/or, the index for representing the distraction state of the driver includes any one or more of the following: the head location deviation degree, the face orientation deviation degree, the gaze direction deviation degree, or the daze degree.

In some optional examples, the first determination unit or the third determination unit configured to determine the head location of the driver in the driver image according to the head pose information, is configured to obtain a pitch angle in the head pose information as the head location; and/or, the first determination unit configured to determine the face orientation of the driver in the driver image according to the head pose information, is configured to obtain the pitch angle and a yaw angle in the head pose information as the face orientation.

In some optional examples, the first determination unit configured to determine the gaze direction of the driver in the driver image according to the head pose information to obtain gaze direction information, is configured to: determine a pupil edge location according to an eye image positioned by an eye key point in the face key points, and compute a pupil center location according to the pupil edge location; obtain eyeball rotation angle information at a head pose corresponding to the head pose information according to the pupil center location and an eye center location; and determine the gaze direction of the driver according to the head pose information and the eyeball rotation angle information to obtain the gaze direction information.

In some optional examples, the first determination unit configured to determine the pupil edge location according to the eye image positioned by the eye key point in the face key points, is configured to perform pupil edge location detection on the eye region image in the image divided according to the face key points based on a seventh neural network, and obtain the pupil edge location according to information output by the seventh neural network.

In some optional examples, the first determination unit configured to obtain the parameter value of the gaze direction deviation degree according to the gaze direction information within a period of time, is configured to obtain the parameter value of the gaze direction deviation degree according to the deviation angle of the gaze direction information relative to a reference gaze direction within a period of time. The reference gaze direction is preset, or the reference gaze direction is an average gaze direction determined based on the first N driver image frames in a video where the driver image is located, where N is an integer greater than 1.

In some optional examples, the first determination unit configured to obtain the parameter value of the daze degree according to the eye state information within a period of time, is configured to: determine, according to the eye state information, that the driver is in a daze state when the eyes of the driver are in an eye open state for a preset period of daze time; and obtain the parameter value of the daze degree according to the eye state information within a period of time, where the period of time includes the preset period of daze time.

In some optional examples, the third determination unit configured to obtain the parameter value of the nap degree according to the head location information within a period of time, is configured to: determine, according to the head location information, that the driver is in a nap state when the head location of the driver has a deviation degree with respect to a preset reference head location reaching a preset deviation range within a first preset period of time and returns to the preset reference head location within a second preset period of time; and obtain the parameter value of the nap degree according to the head location information within a period of time, where the period of time includes the first preset period of time and the second preset period of time.

In some optional examples, the third determination unit configured to obtain the parameter value of the yawning degree according to the mouth state information within a period of time, is configured to: determine, according to the mouth state information, that the driver completes a yawn action when the time that the mouth of the driver changes from a mouth closed state to a mouth open state and then returns to the mouth closed state is within a preset time range; and obtain the parameter value of the yawning degree according to the mouth state information within a period of time, where the period of time includes the time that the mouth of the driver changes from the mouth closed state to the mouth open state and then returns to the mouth closed state.

In some optional examples, the parameter value of the head location deviation degree includes any one or more of the following: the head location deviation state, the head location deviation direction, a deviation angle of the head location in the head location deviation direction, a head location deviation duration, or a head location deviation frequency; and/or, the parameter value of the face orientation deviation degree includes any one or more of the following: the number of head turns, a head turn duration, or a head turn frequency; and/or, the parameter value of the gaze direction deviation degree includes any one or more of the following: a gaze direction deviation angle, a gaze direction deviation duration, or a gaze direction deviation frequency; and/or, the parameter value of the daze degree includes any one or more of the following: an eye open level, an eye open duration, or a ratio of an eye open cumulative duration to a statistical time window; and/or, the parameter value of the nap degree includes any one or more of the following: a nap nodding state, a nap nodding level, the number of nap nods, a nap nodding frequency, or a nap nodding duration; and/or, the parameter value of the eye closure degree includes any one or more of the following: the number of eye closures, an eye closure frequency, an eye closure duration, an eye closure level, the number of eye semi-closures, an eye semi-closure frequency, or a ratio of an eye closure cumulative duration to the statistical time window; and/or, the parameter value of the blink degree includes any one or more of the following: the number of blinks, a blink frequency, a blink duration, or a ratio of a blink cumulative duration to the statistical time window; and/or, the parameter value of the yawning degree includes any one or more of the following: a yawning state, the number of yawns, a yawn duration, or a yawning frequency.

In some optional examples, the second determination unit is configured to: determine that the distraction state detection result of the driver is a distraction state when any one or more of the parameter values of the indexes for representing the distraction state of the driver satisfy a predetermined distraction condition; and/or, determine that the distraction state detection result of the driver is a non-distraction state when none of the parameter values of the indexes for representing the distraction state of the driver satisfies the predetermined distraction condition.

In some optional examples, the predetermined distraction condition includes multiple distraction level conditions. Accordingly, the second determination unit configured to determine that the distraction state detection result of the driver is the distraction state when any one or more of the parameter values of the indexes for representing the distraction state of the driver satisfy the predetermined distraction condition, is configured to: determine the distraction state level according to the distraction level condition satisfied by the parameter value of the index for representing the distraction state of the driver; and take the determined distraction state level as the distraction state detection result of the driver.

In some optional examples, the fourth determination unit is configured to determine that the fatigue state detection result of the driver is a fatigue state when any one or more of the parameter values of the indexes for representing the fatigue state of the driver satisfy a predetermined fatigue condition; and/or, determine that the fatigue state detection result of the driver is a non-fatigue state when none of the parameter values of the indexes for representing the fatigue state of the driver satisfies the predetermined fatigue condition.

In some optional examples, the predetermined fatigue condition includes multiple fatigue level conditions. Accordingly, the fourth determination unit configured to determine that the fatigue state detection result of the driver is the fatigue state when any one or more of the parameter values of the indexes for representing the fatigue state of the driver satisfy the predetermined fatigue condition, is configured to determine a fatigue state level according to the fatigue level condition satisfied by the parameter value of the index for representing the fatigue state of the driver; and take the determined fatigue state level as the fatigue state detection result of the driver.

In addition, referring again to FIG. 5, in yet another embodiment of the driving state detection apparatus of the present disclosure, the apparatus further includes: a second detection module, configured to perform predetermined distraction action detection on the driver image to determine whether a predetermined distraction action occurs; a first obtaining module, configured to obtain, if the predetermined distraction action occurs, the parameter value of the index for representing the distraction degree of the driver according to a determination result indicating whether the predetermined distraction action occurs within a period of time; and a fourth determination module, configured to determine a detection result of the predetermined distraction action of the driver according to the parameter value of the index for representing the distraction degree of the driver. The parameter value of the distraction degree includes any one or more of the following: the number of occurrences of the predetermined distraction action, duration of the predetermined distraction action, or the frequency of the predetermined distraction action, and the like. The predetermined distraction action includes any one or more of the following: a smoking action, a drinking action, an eating action, a calling action, an entertainment action, a makeup action, or the like.

In some implementations, the second detection module is configured to extract a feature of the driver image; extract multiple candidate boxes that may include the predetermined distraction action based on the feature; determine an action target box based on the multiple candidate boxes, where the action target box includes a local region of a face and an action interaction object, or further includes a hand region; and perform classification detection on the predetermined distraction action based on the action target box to determine whether the predetermined distraction action occurs. The local region of the face includes any one or more of the following: a mouth region, an ear region, or an eye region; and/or, the action interaction object includes any one or more of the following: a container, a cigarette, a mobile phone, food, a tool, a beverage bottle, eyeglasses, or a mask.

In some implementations, the second detection module is configured to perform face detection on the driver image by means of an eighth neural network to obtain a face bounding box, and extract feature information of the face bounding box; and determine whether the smoking action occurs by means of the eighth neural network according to the feature information of the face bounding box.

In some implementations, the second detection module is configured to perform preset target object detection corresponding to the eating action/drinking action/calling action/entertainment action/makeup action on the driver image by means of a ninth neural network to obtain a bounding box of a preset target object, where the preset target object includes hands, mouth, eyes, and the action interaction object, and the action interaction object includes any one or more types of the following: a container, food, an electronic device, and cosmetics; and determine whether the predetermined distraction action occurs according to the bounding box of the preset target object, where the determination result of whether the predetermined distraction action occurs includes one of the following: no eating action/drinking action/calling action/entertainment action/makeup action occurs; the eating action occurs; the drinking action occurs; the calling action occurs; the entertainment action occurs; and the makeup action occurs.

In some implementations, the second detection module configured to determine whether the predetermined distraction action occurs according to the bounding box of the preset target object, is configured to determine whether the predetermined distraction action occurs according to whether a hand bounding box, a mouth bounding box, an eye bounding box, and an action interaction object bounding box are detected, whether the hand bounding box overlaps the action interaction object bounding box, the type of the action interaction object, and whether the distance between the action interaction object bounding box and the mouth bounding box or the eye bounding box satisfies a preset condition.

In some implementations, the second detection module configured to determine whether the predetermined distraction action occurs according to whether the hand bounding box overlaps the action interaction object bounding box, and whether the location relationship between the action interaction object bounding box and the mouth bounding box or the eye bounding box satisfies a preset condition, is configured to: if the hand bounding box overlaps the action interaction object bounding box, the type of the action interaction object is a container or food, and the action interaction object bounding box overlaps the mouth bounding box, determine that the eating action, driving action or makeup action occurs; and/or, if the hand bounding box overlaps the action interaction object bounding box, the type of the action interaction object is an electronic device, and the minimum distance between the action interaction object bounding box and the mouth bounding box is less than a first preset distance, or the minimum distance between the action interaction object bounding box and the eye bounding box is less than a second preset distance, determine that the entertainment action or calling action occurs.

In some implementations, the second detection module is further configured to: if the hand bounding box, the mouth bounding box, and any action interaction object bounding box are not detected simultaneously, and the hand bounding box, the eye bounding box, and any action interaction object bounding box are not detected simultaneously, determine that the determination result of whether the predetermined distraction action occurs is that no eating action, drinking action, calling action, entertainment action, and makeup action is detected; and/or, if the hand bounding box does not overlap the action interaction object bounding box, determine that the determination result of whether the predetermined distraction action occurs is that no eating action, drinking action, calling action, entertainment action, and makeup action is detected; and/or, if the type of the action interaction object is a container or food, and the action interaction object bounding box does not overlap the mouth bounding box, and/or, the type of the action interaction object is an electronic device, and the minimum distance between the action interaction object bounding box and the mouth bounding box is not less than the first preset distance, or the minimum distance between the action interaction object bounding box and the eye bounding box is not less than the second preset distance, determine that the determination result of whether the predetermined distraction action occurs is that no eating action, drinking action, calling action, entertainment action, and makeup action is detected.

In addition, referring again to FIG. 5, in still another embodiment of the driving state detection apparatus of the present disclosure, the apparatus further includes: a fifth determination module, configured to determine the distraction action level according to the distraction action level condition satisfied by the parameter value of the index for representing the distraction degree. Accordingly, in the embodiments, the fourth determination module is configured to take the determined distraction action level as the detection result of the predetermined distraction action.

In addition, referring again to FIG. 5, in still another embodiment of the driving state detection apparatus of the present disclosure, the apparatus further includes: an alarm module, configured to perform alarming according to the detection results of the driver states; and/or, a driving control module, configured to perform intelligent driving control according to the detection results of the driver states. The detection results of the driver states include any one or more of the following: a fatigue state detection result, a distraction state detection result, or a detection result of the predetermined distraction action.

In the foregoing embodiments, the alarm module is further configured to output, in response to the detection result of the predetermined distraction action satisfying a predetermined alarm condition, alarm information corresponding to the detection result of the predetermined distraction action that satisfies the predetermined alarm condition.

In some implementations, the alarm module configured to output, in response to one of the fatigue state detection result and the distraction state detection result satisfying the predetermined alarm condition, the alarm information of the corresponding detection result that satisfies the predetermined alarm condition, is configured to output, in response to one of the fatigue state detection result, the distraction state detection result, and the detection result of the predetermined distraction action satisfying the predetermined alarm condition, alarm information of the corresponding detection result that satisfies the predetermined alarm condition.

In some implementations, the alarm module configured to output, in response to both the fatigue state detection result and the distraction state detection result satisfying the predetermined alarm condition, the alarm information of the fatigue state detection result that satisfies the predetermined alarm condition, is configured to: in response to the fatigue state detection result, the distraction state detection result, and the detection result of the predetermined distraction motion all satisfying the predetermined alarm condition, output alarm information of the fatigue state detection result that satisfies the predetermined alarm condition; and/or, in response to two of the fatigue state detection result, the distraction state detection result, and the detection result of the predetermined distraction action satisfying the predetermined alarm condition, output the alarm information according to a preset alarm strategy.

The alarm module configured output, in response to two of the fatigue state detection result, the distraction state detection result, and the detection result of the predetermined distraction action satisfying the predetermined alarm condition, the alarm information according to the preset alarm strategy, is configured to: in response to the fatigue state detection result and the detection result of the predetermined distraction action satisfying the predetermined alarm condition, outputting alarm information of the fatigue state detection result that satisfies the predetermined alarm condition; and/or, in response to two of the distraction state detection result and the detection result of the predetermined distraction action satisfying the predetermined alarm condition, outputting alarm information of the distraction state detection result that satisfies the predetermined alarm condition, or outputting alarm information corresponding to the detection result of the predetermined distraction action that satisfies the predetermined alarm condition.

In further implementations, the alarm module is further configured to suppress the alarm information corresponding to other detection results that satisfy the predetermined alarm condition within a preset period of time after outputting the alarm information corresponding to the detection result of the predetermined distraction action that satisfies the predetermined alarm condition.

In some implementations, the alarm module is configured to: when the fatigue state detection result is the fatigue state level, output corresponding prompt or warning information according to the fatigue state level; and/or, when the distraction state detection result is the distraction state level, output corresponding prompt or warning information according to the distraction state level; and/or, when the detection result of the predetermined distraction action is the distraction action level, output corresponding prompt or warning information according to the distraction action level.

In addition, referring again to FIG. 5, in still another embodiment of the driving state detection apparatus of the present disclosure, the apparatus further includes: a driving control module, configured to switch, in response to any one or more of the fatigue state detection result, the distraction state detection result, and the detection result of the predetermined distraction action satisfying a predetermined driving mode switching condition, the driving mode to an automatic driving mode.

In some implementations, the driving control module is configured to switch the driving mode to the automatic driving mode when the fatigue state level and/or the distraction state level and/or the distraction action level satisfies the predetermined driving mode switching condition.

In addition, referring again to FIG. 5, in the foregoing embodiments of the present disclosure, the apparatus further includes: an infrared camera, configured to perform image acquisition to obtain the driver image. The infrared camera is deployed in at least one location in a vehicle, for example, any one or more of the following locations: a location above or near a dashboard, a location above or near a center console, an A-pillar or nearby location, or a rearview mirror or nearby location.

In some implementations, the infrared camera is configured to perform image acquisition when the vehicle is in a driving state, to obtain the driver image; and/or, perform image acquisition when a running speed of the vehicle exceeds a preset speed, to obtain the driver image; and/or, perform image acquisition after detecting that the vehicle is powered on, to obtain the driver image; and/or, perform image acquisition when a start instruction of the vehicle is detected, to obtain the driver image; and/or, perform image acquisition when a control instruction to the vehicle or a component or system in the vehicle is detected, to obtain the driver image.

Figure 6:
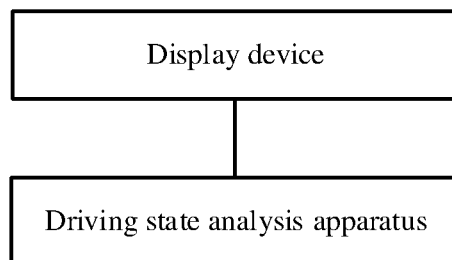
FIG. 6 is a schematic structural diagram of one embodiment of a driver monitoring system according to the present disclosure.

FIG. 6 is a schematic structural diagram of one embodiment of a driver monitoring system according to the present disclosure. The driver monitoring system of the embodiments may be configured to implement the foregoing driving state detection method embodiments of the present disclosure. As shown in FIG. 6, the driver state monitoring system of the embodiments includes: a display device, configured to display a driver image; and a driving state analysis apparatus, configured to: perform fatigue state detection and distraction state detection for the driver on the driver image to obtain the fatigue state detection result and a distraction state detection result; in response to one of the fatigue state detection result and the distraction state detection result satisfying a predetermined alarm condition, output alarm information of the corresponding detection result that satisfies the predetermined alarm condition; and/or, in response to both the fatigue state detection result and the distraction state detection result satisfying the predetermined alarm condition, output alarm information of the fatigue state detection result that satisfies the predetermined alarm condition.

A driver state detection apparatus includes the driving state detection apparatus according to any one of the foregoing embodiments of the present disclosure.

Based on the driver monitoring system provided by the foregoing embodiments of the present disclosure, joint detection of the driver's fatigue state and the driver's distraction state can be implemented on a driver image; when one of the fatigue state detection result and the distraction state detection result satisfies a predetermined alarm condition, alarm information of a corresponding detection result that satisfies the predetermined alarm condition is output; and/or, when both the fatigue state detection result and the distraction state detection result satisfy the predetermined alarm condition, alarm information of the fatigue state detection result that satisfies the predetermined alarm condition is output, in order to prompt the driver to pay attention, thus improving driving safety and reducing the incidence of road traffic accidents. Moreover, when both the fatigue state detection result and the distraction state detection result satisfy the predetermined alarm condition, only the alarm information of the fatigue state detection result that satisfies the predetermined alarm condition is output, so that the distraction and disgust of the driver caused by too many or too frequent alarms may be avoided. The present disclosure improves the safety of assisted driving and user experience by optimizing the alarm strategy.

In addition, another electronic device provided in the embodiments of the present disclosure includes:

a memory, configured to store a computer program; and a processor, configured to execute the computer program stored in the memory, where when the computer program is executed, the driving state analysis method according to any of the foregoing embodiments of the present disclosure is implemented.

Figure 7:
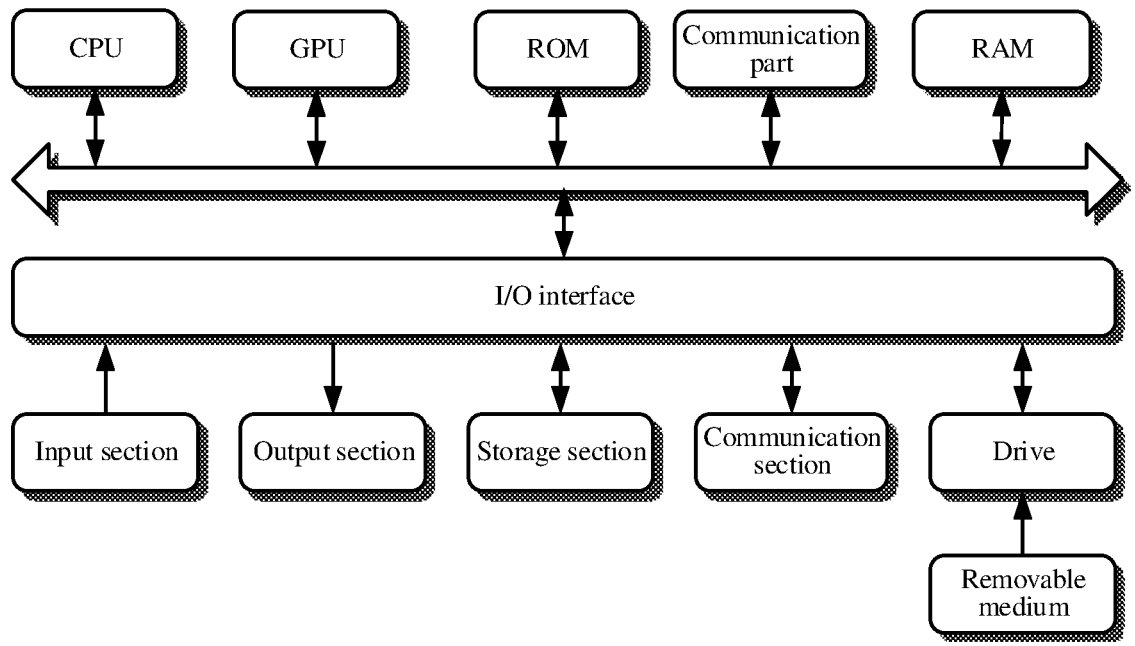
FIG. 7 is a schematic structural diagram of one application embodiment of an electronic device according to the present disclosure.

FIG. 7 is a schematic structural diagram of one application embodiment of an electronic device according to the present disclosure. Referring to FIG. 7 below, a schematic structural diagram of an electronic device, which may be a terminal device or a server, suitable for implementing the embodiments of the present disclosure is shown. As shown in FIG. 7, the electronic device includes one or more processors, a communication part, and the like. The one or more processors are, for example, one or more Central Processing Units (CPUs), and/or one or more Graphic Processing Units (GPUs), and the like. The processor may perform various appropriate actions and processing according to executable instructions stored in a Read-Only Memory (ROM) or executable instructions loaded from a storage section to a Random Access Memory (RAM). The communication part may include, but is not limited to, a network card, which may include, but is not limited to, an Infiniband (IB) network card, and the processor may communicate with the ROM and/or the RAM to execute executable instructions, is connected to the communication part through the bus, and communicates with other target devices via the communication part, thereby completing operations corresponding to any method provided by the embodiments of the present disclosure, for example, performing fatigue state detection and distraction state detection for a driver on a driver image to obtain a fatigue state detection result and a distraction state detection result; in response to one of the fatigue state detection result and the distraction state detection result satisfying a predetermined alarm condition, outputting alarm information of the corresponding detection result that satisfies the predetermined alarm condition; and/or, in response to both the fatigue state detection result and the distraction state detection result satisfying the predetermined alarm condition, outputting alarm information of the fatigue state detection result that satisfies the predetermined alarm condition.

In addition, the RAM may further store various programs and data required for operations of an apparatus. The CPU, the ROM, and the RAM are connected to each other via the bus. In the presence of the RAM, the ROM is an optional module. The RAM stores executable instructions, or writes the executable instructions into the ROM during running, where the executable instructions cause the processor to execute corresponding operations of any method of this disclosure. An input/output (I/O) interface is also connected to the bus. The communication part may be integrated, or may be configured to have a plurality of sub-modules (for example, a plurality of IB network cards) connected to the bus.

The following components are connected to the I/O interface: an input section including a keyboard, a mouse and the like; an output section including a Cathode-Ray Tube (CRT), a Liquid Crystal Display (LCD), a speaker and the like; the storage section including a hard disk and the like; and a communication section of a network interface card including an LAN card, a modem and the like. The communication section performs communication processing via a network such as the Internet. A drive is also connected to the I/O interface according to requirements. A removable medium such as a magnetic disk, an optical disk, a magneto-optical disk, a semiconductor memory or the like is mounted on the drive according to requirements, so that a computer program read from the removable medium may be installed on the storage section according to requirements.

It should be noted that the architecture shown in FIG. 7 is merely an optional implementation. During specific practice, the number and types of the components in FIG. 7 is selected, decreased, increased, or replaced according to actual requirements. Different functional components are separated or integrated or the like. For example, the GPU and the CPU are separated, or the GPU is integrated on the CPU, and the communication part is separated from or integrated on the CPU or the GPU or the like. These alternative implementations all fall within the scope of protection of the present disclosure.

Particularly, a process described above with reference to a flowchart according to the embodiments of the present disclosure may be implemented as a computer software program. For example, the embodiments of the present disclosure include a computer program product, which includes a computer program tangibly included in a machine-readable medium. The computer program includes a program code for performing a method shown in the flowchart. The program code may include instructions for performing steps of the method provided in any one of the embodiments of the present disclosure. In such an embodiment, the computer program is downloaded and installed from the network through the communication section, and/or is installed from the removable medium. When the computer program is executed by the CPU, the functions defined in the method according to the present disclosure are executed.

In addition, the embodiments of the present disclosure also provide a computer program, including computer instructions, where when the computer instructions are run in a processor of a device, the driving state analysis method according to any of the foregoing embodiments of the present disclosure is implemented.

In addition, the embodiments of the present disclosure also provide a computer-readable storage medium, having a computer program stored thereon, where when the computer program is executed by a processor, the driving state analysis method according to any of the foregoing embodiments of the present disclosure is implemented.

Figure 8:
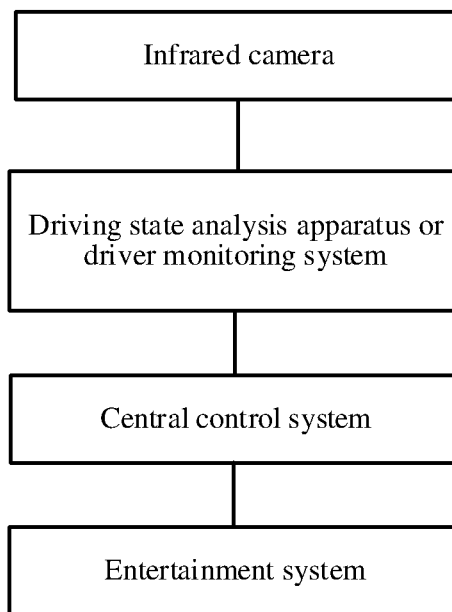
FIG. 8 is a schematic structural diagram of one embodiment of a vehicle according to the present disclosure.

FIG. 8 is a schematic structural diagram of one embodiment of a vehicle according to the present disclosure. As shown in FIG. 8, the vehicle of this embodiment includes a central control system, and further includes the driving state analysis apparatus or the driver monitoring system according to any of the foregoing embodiments of the present disclosure.

Based on the vehicle provided by the foregoing embodiments of the present disclosure, joint detection of the driver's fatigue state and the driver's distraction state can be implemented for the driver image; when one of the fatigue state detection result and the distraction state detection result satisfies a predetermined alarm condition, alarm information of a corresponding detection result that satisfies the predetermined alarm condition is output; and/or, when both the fatigue state detection result and the distraction state detection result satisfy the predetermined alarm condition, alarm information of the fatigue state detection result that satisfies the predetermined alarm condition is output, in order to prompt the driver to pay attention, thus improving driving safety and reducing the incidence of road traffic accidents. Moreover, when both the fatigue state detection result and the distraction state detection result satisfy the predetermined alarm condition, only the alarm information of the fatigue state detection result that satisfies the predetermined alarm condition is output, so that the distraction and disgust of the driver caused by too many or too frequent alarms may be avoided. The present disclosure improves the driving safety and user experience by optimizing the alarm strategy.

In some implementations, the central control system is configured to switch, when the detection results of the driver states satisfy a predetermined driving mode switching condition, the driving mode to an automatic driving mode, and perform automatic driving control on the vehicle in the automatic driving mode.

In some other embodiments, the central control system is further configured to switch the driving mode to a manual driving mode when a driving instruction for switching to manual driving is received.

Referring again to FIG. 8, the vehicle of the foregoing embodiments may further include: an entertainment system, configured to output prompt/warning information corresponding to the alarm condition according to a control instruction of the central control system; and/or adjust an early-warning effect of prompt/warning information or a playback effect of entertainment according to the control instruction of the central control system.

The entertainment system, for example, may include a speaker, a buzzer, a lighting device, and the like.

Referring again to FIG. 8, the vehicle of the foregoing embodiments may further include: at least one infrared camera, configured to perform image acquisition.

In some of the embodiments, the infrared camera in the vehicle is deployed in at least one location in the vehicle, for example, is deployed in any one or more of the following locations: a location above or near a dashboard, a location above or near a center console, an A-pillar or nearby location, or a rearview mirror or nearby location.

The embodiments in the description are all described in a progressive manner, for same or similar parts in the embodiments, refer to these embodiments, and each embodiment focuses on a difference from other embodiments. The system embodiments correspond to the method embodiments substantially and therefore are only described briefly, and for the associated part, refer to the descriptions of the method embodiments.

The methods, apparatuses, and devices in the present disclosure are implemented in many manners. For example, the methods, apparatuses, and devices in the present disclosure may be implemented with software, hardware, firmware, or any combination of software, hardware, and firmware. Unless otherwise specially stated, the foregoing sequences of steps of the methods are merely for description, and are not intended to limit the steps of the methods of this disclosure. In addition, in some embodiments, the present disclosure may also be implemented as programs recorded in a recording medium. The programs include machine-readable instructions for implementing the methods according to the present disclosure. Therefore, the present disclosure further covers the recording medium storing the programs for executing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present disclosure, and to make a person of ordinary skill in the art understand the present disclosure, so as to design various embodiments with various modifications applicable to particular use.

The invention claimed is:

1. A driving state analysis method, comprising:
   determining whether a deviation angle of a head location of a driver in a driver image exceeds a preset range;
   in response to determining that the deviation angle of the head location of the driver exceeds the preset range, performing distraction state detection for the driver on the driver image to obtain a distraction state detection result;
   in response to determining that the deviation angle of the head location of the driver does not exceed the preset range, performing fatigue state detection and the distraction state detection for the driver on the driver image to obtain a fatigue state detection result and the distraction state detection result; and
   in response to at least one of the fatigue state detection result and the distraction state detection result satisfying a predetermined alarm condition, outputting alarm information satisfying the predetermined alarm condition;
   wherein in response to at least one of the fatigue state detection result and the distraction state detection result satisfying the predetermined alarm condition, outputting the alarm information satisfying the predetermined alarm condition comprises:
   outputting prompt/warning information corresponding to the fatigue state detection result when the fatigue state detection result is a fatigue state;

outputting prompt/warning information corresponding to the distraction state detection result when the distraction state detection result is a distraction state; and outputting the prompt/warning information corresponding to the fatigue state detection result when the fatigue state detection result is the fatigue state and the distraction state detection result is the distraction state.

2. The method according to claim 1, further comprising at least one of:

suppressing alarm information corresponding to other detection results that satisfy the predetermined alarm condition within a preset period of time after outputting the alarm information corresponding to the fatigue state detection result; or suppressing the alarm information corresponding to other detection results that satisfy the predetermined alarm condition within a preset period of time after outputting the alarm information corresponding to the distraction state detection result.

3. The method according to claim 1, wherein performing fatigue state detection and the distraction state detection for the driver on the driver image comprises:

performing head pose detection, eye state detection, and/or mouth state detection on the driver image to obtain head pose information, eye state information, and/or mouth state information;

determining a parameter value of an index for representing the fatigue state of the driver and a parameter value of an index for representing the distraction state of the driver according to the head pose information, the eye state information, and/or the mouth state information;

determining the fatigue state detection result of the driver according to the parameter value of the index for representing the fatigue state of the driver; and determining the distraction state detection result of the driver according to the parameter value of the index for representing the distraction state of the driver;

wherein determining the parameter value of the index for representing the fatigue state of the driver and the parameter value of the index for representing the distraction state of the driver according to the head pose information, the eye state information, and/or the mouth state information comprises at least one of:

determining the head location of the driver in the driver image according to the head pose information to obtain head location information, and obtaining a parameter value of a head location deviation degree according to the head location information within a first period of time;

determining face orientation of the driver in the driver image according to the head pose information to obtain face orientation information, and obtaining a parameter value of a face orientation deviation degree according to the face orientation information within a second period of time;

determining a gaze direction of the driver in the driver image according to the head pose information to obtain first gaze direction information, and obtaining a parameter value of a first gaze direction deviation degree according to the first gaze direction information within a third period of time;

determining an eye region image in the driver image according to face key points, obtaining second gaze direction information of the driver in the eye region image based on a sixth neural network, and obtaining a parameter value of a second gaze direction deviation degree according to the second gaze direction information within a fourth period of time;

obtaining a parameter value of a daze degree according to the eye state information within a fifth period of time;

determining the head location of the driver in the driver image according to the head pose information to obtain the head location information, and obtaining a parameter value of a nap degree according to the head location information within a sixth period of time;

obtaining a parameter value of an eye closure degree according to the eye state information within a seventh period of time;

obtaining a parameter value of a blink degree according to the eye state information within an eighth period of time; or obtaining a parameter value of a yawning degree according to the mouth state information within a ninth period of time;

wherein the index for representing the fatigue state of the driver comprises one or more of the following: the nap degree, the eye closure degree, the blink degree, or the yawning degree; and wherein the index for representing the distraction state of the driver comprises one or more of the following: the head location deviation degree, the face orientation deviation degree, the first gaze direction deviation degree, the second gaze direction deviation degree, or the daze degree.

4. The method according to claim 3, further comprising:
presetting a reference gaze direction; or taking an average gaze direction determined based on first N driver image frames in a video comprising the driver image as the reference gaze direction, wherein N is an integer greater than 1;

wherein obtaining the parameter value of the first gaze direction deviation degree according to the first gaze direction information within the third period of time comprises:

obtaining the parameter value of the first gaze direction deviation degree according to a deviation angle of the first gaze direction information within the third period of time relative to the reference gaze direction, or wherein obtaining the parameter value of the second gaze direction deviation degree according to the second gaze direction information within the fourth period of time comprises:

obtaining the parameter value of the second gaze direction deviation degree according to a deviation angle of the second gaze direction information within the fourth period of time relative to the reference gaze direction.

5. The method according to claim 3, wherein obtaining the parameter value of the daze degree according to the eye state information within the fifth period of time comprises:

determining that the driver is in a daze state when the eyes of the driver are in an eye open state for a preset period of daze time according to the eye state information; and obtaining the parameter value of the daze degree according to the eye state information within the fifth period of time, wherein the fifth period of time comprises the preset period of daze time.

6. The method according to claim 3, wherein obtaining the parameter value of the nap degree according to the head location information within the sixth period of time comprises:

determining that the driver is in a nap state when the head location of the driver has a deviation degree with respect to a preset reference head location reaching a preset deviation range within a first preset period of time and returns to the preset reference head location within a second preset period of time according to the head location information; and obtaining the parameter value of the nap degree according to the head location information within the sixth period of time, wherein the sixth period of time comprises the first preset period of time and the second preset period of time.

7. The method according to claim 3, wherein obtaining the parameter value of the yawning degree according to the mouth state information within the ninth period of time comprises:

determining that the driver completes a yawn action when a time that the mouth of the driver changes from a mouth closed state to a mouth open state and then returns to the mouth closed state is within a preset time range according to the mouth state information; and obtaining the parameter value of the yawning degree according to the mouth state information within the ninth period of time, wherein the period of time comprises the time that the mouth of the driver changes from the mouth closed state to the mouth open state and then returns to the mouth closed state.

8. The method according to claim 3, wherein determining the distraction state detection result of the driver according to the parameter value of the index for representing the distraction state of the driver comprises:

determining that the distraction state detection result of the driver is the distraction state when one or more of the parameter values of the indexes for representing the distraction state of the driver satisfy a predetermined distraction condition;

wherein the predetermined distraction condition comprises multiple distraction level conditions;

determining that the distraction state detection result of the driver is the distraction state when one or more of the parameter values of the indexes for representing the distraction state of the driver satisfy the predetermined distraction condition comprises:

determining a distraction state level according to one of the distraction level conditions satisfied by the parameter value of the index for representing the distraction state of the driver; and taking the determined distraction state level as the distraction state detection result of the driver;

or determining the fatigue state detection result of the driver according to the parameter value of the index for representing the fatigue state of the driver comprises:

determining that the fatigue state detection result of the driver is the fatigue state when one or more of the parameter values of the indexes for representing the fatigue state of the driver satisfy a predetermined fatigue condition; wherein the predetermined fatigue condition comprises multiple fatigue level conditions;

determining that the fatigue state detection result of the driver is the fatigue state when one or more of the parameter values of the indexes for representing the fatigue state of the driver satisfy the predetermined fatigue condition comprises:

determining a fatigue state level according to one of the fatigue level conditions satisfied by the parameter value of the index for representing the fatigue state of the driver; and taking the determined fatigue state level as the fatigue state detection result of the driver.

9. The method according to claim 1, further comprising:

performing predetermined distraction action detection on the driver image to determine whether a predetermined distraction action occurs;

in response to determining that the predetermined distraction action occurs, obtaining the parameter value of the index for representing the distraction degree of the driver according to a determination result indicating whether the predetermined distraction action occurs within a period of time; and determining a detection result of the predetermined distraction action of the driver according to the parameter value of the index for representing the distraction degree of the driver;

wherein the predetermined distraction action comprises one or more of the following: a smoking action, a drinking action, an eating action, a calling action, an entertainment action, or a makeup action.

10. The method according to claim 9, wherein performing predetermined distraction action detection on the driver image to determine whether the predetermined distraction action occurs comprises:

extracting a feature of the driver image;

extracting multiple candidate boxes that comprise the predetermined distraction action based on the feature;

determining an action target box based on the multiple candidate boxes, wherein the action target box comprises a local region of a face and an action interaction object; and performing classification detection on the predetermined distraction action based on the action target box to determine whether the predetermined distraction action occurs.

11. The method according to claim 10, wherein the local region of the face comprises one or more of the following: a mouth region, an ear region, or an eye region;

the action interaction object comprises one or more of the following: a container, a cigarette, a mobile phone, food, a tool, a beverage bottle, eyeglasses, or a mask; and the action target box further comprises a hand bounding box.

12. The method according to claim 10, wherein performing predetermined distraction action detection on the driver image to determine whether the predetermined distraction action occurs comprises:

performing face detection on the driver image by means of an eighth neural network to obtain a face bounding box;

extracting feature information of the face bounding box; and determining whether the smoking action occurs by means of the eighth neural network according to the feature information of the face bounding box.

13. The method according to claim 10, wherein performing predetermined distraction action detection on the driver image to determine whether the predetermined distraction action occurs comprises:

performing preset target object detection corresponding to the eating action, the drinking action, the calling action, the entertainment action, or the makeup action on the driver image by means of a ninth neural network to obtain a bounding box of a preset target object, wherein the preset target object comprises hands, mouth, eyes, and the action interaction object, and the action interaction object comprises one or more types of the following: a container, food, an electronic device, or cosmetics; and determining whether the predetermined distraction action occurs according to the bounding box of the preset target object, wherein the determination result of whether the predetermined distraction action occurs comprises one of the following: no eating action, no drinking action, no calling action, no entertainment action, and no makeup action occur; the eating action occurs; the drinking action occurs; the calling action occurs; the entertainment action occurs; or the makeup action occurs.

14. The method according to claim 10, wherein the action target box further comprises a hand bounding box; and determining whether the predetermined distraction action occurs according to the bounding box of the preset target object comprises:

determining whether the predetermined distraction action occurs according to whether a hand bounding box, a mouth bounding box, an eye bounding box, and an action interaction object bounding box are detected, whether the hand bounding box overlaps the action interaction object bounding box, the type of the action interaction object, and whether a distance between the action interaction object bounding box and the mouth bounding box or the eye bounding box satisfies a preset condition.

15. The method according to claim 14, wherein determining whether the predetermined distraction action occurs according to whether the hand bounding box overlaps the action interaction object bounding box, and whether a location relationship between the action interaction object bounding box and the mouth bounding box or the eye bounding box satisfies the preset condition comprises at least one of:

in response to determining that the hand bounding box overlaps the action interaction object bounding box, the type of the action interaction object is a container or food, and the action interaction object bounding box overlaps the mouth bounding box, determining that the eating action, the driving action, or the makeup action occurs; or in response to determining that the hand bounding box overlaps the action interaction object bounding box, the type of the action interaction object is an electronic device, and a minimum distance between the action interaction object bounding box and the mouth bounding box is less than a first preset distance, or a minimum distance between the action interaction object bounding box and the eye bounding box is less than a second preset distance, determining that the entertainment action or the calling action occurs.

16. The method according to claim 14, further comprising at least one of:

in response to determining that the hand bounding box, the mouth bounding box, and action interaction object bounding box are not detected simultaneously, and the hand bounding box, the eye bounding box, and action interaction object bounding box are not detected simultaneously, determining that the determination result of whether the predetermined distraction action occurs is that no eating action, no drinking action, no calling action, no entertainment action, and no makeup action are detected;

in response to determining that the hand bounding box does not overlap the action interaction object bounding box, determining that the determination result of whether the predetermined distraction action occurs is that no eating action, no drinking action, no calling action, no entertainment action, and no makeup action are detected; or in response to determining that the type of the action interaction object is a container or food, and the action interaction object bounding box does not overlap the mouth bounding box, and/or, the type of the action interaction object is an electronic device, and a minimum distance between the action interaction object bounding box and the mouth bounding box is not less than a first preset distance, or a minimum distance between the action interaction object bounding box and the eye bounding box is not less than a second preset distance, determining that the determination result of whether the predetermined distraction action occurs is that no eating action, no drinking action, no calling action, no entertainment action, and no makeup action are detected.

17. The method according to claim 9, further comprising:

in response to the fatigue state detection result, the distraction state detection result, and the detection result of the predetermined distraction action satisfying the predetermined alarm condition, outputting alarm information of the fatigue state detection result that satisfies the predetermined alarm condition; or in response to the fatigue state detection result and the detection result of the predetermined distraction action satisfying the predetermined alarm condition, outputting the alarm information of the fatigue state detection result that satisfies the predetermined alarm condition.

18. An electronic device, comprising:

a memory, configured to store a computer program; and a processor, configured to execute the compute program stored in the memory, wherein when the computer program is executed, the processor is caused to execute actions comprising:

determining whether a deviation angle of a head location of a driver in a driver image exceeds a preset range;

in response to determining that the deviation angle of the head location of the driver exceeds the preset range, performing distraction state detection for the driver on the driver image to obtain a distraction state detection result;

in response to determining that the deviation angle of the head location of the driver does not exceed the preset range, performing fatigue state detection and the distraction state detection for the driver on the driver image to obtain a fatigue state detection result and the distraction state detection result; and in response to at least one of the fatigue state detection result and the distraction state detection result satisfying a predetermined alarm condition, outputting alarm information satisfying the predetermined alarm condition; wherein in response to at least one of the fatigue state detection result and the distraction state detection result satisfying the predetermined alarm condition, outputting the alarm information satisfying the predetermined alarm condition comprises:

outputting prompt/warning information corresponding to the fatigue state detection result when the fatigue state detection result is a fatigue state;

outputting prompt/warning information corresponding to the distraction state detection result when the distraction state detection result is a distraction state; and outputting the prompt/warning information corresponding to the fatigue state detection result when the fatigue state detection result is the fatigue state and the distraction state detection result is the distraction state.

19. A non-transitory computer-readable storage medium having a computer program stored thereon, wherein when the computer program is executed by a processor, the processor is caused to execute actions comprising:

determining whether a deviation angle of a head location of a driver in a driver image exceeds a preset range;

in response to determining that the deviation angle of the head location of the driver exceeds the preset range, performing distraction state detection for the driver on the driver image to obtain a distraction state detection result; or in response to determining that the deviation angle of the head location of the driver does not exceed the preset range, performing fatigue state detection and the distraction state detection for the driver on the driver image to obtain a fatigue state detection result and the distraction state detection result; and in response to at least one of the fatigue state detection result and the distraction state detection result satisfying a predetermined alarm condition, outputting alarm information satisfying the predetermined alarm condition; wherein in response to at least one of the fatigue state detection result and the distraction state detection result satisfying the predetermined alarm condition, outputting the alarm information satisfying the predetermined alarm condition comprises:

outputting prompt/warning information corresponding to the fatigue state detection result when the fatigue state detection result is a fatigue state;

outputting prompt/warning information corresponding to the distraction state detection result when the distraction state detection result is a distraction state; and outputting the prompt/warning information corresponding to the fatigue state detection result when the fatigue state detection result is the fatigue state and the distraction state detection result is the distraction state.

* * * * *